United States Patent
Massard

(10) Patent No.: US 9,759,905 B2
(45) Date of Patent: *Sep. 12, 2017

(54) ELECTROWETTING DISPLAY DEVICE WITH STABLE DISPLAY STATES

(71) Applicant: Amazon Technologies, Inc., Seattle, WA (US)

(72) Inventor: Romaric Mathieu Massard, Eindhoven (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 274 days.

This patent is subject to a terminal disclaimer.

(21) Appl. No.: 14/579,680

(22) Filed: Dec. 22, 2014

(65) Prior Publication Data

US 2016/0178888 A1 Jun. 23, 2016

(51) Int. Cl.
*G02B 26/00* (2006.01)
*G09G 3/20* (2006.01)
(Continued)

(52) U.S. Cl.
CPC ........... *G02B 26/005* (2013.01); *G09G 3/348* (2013.01); *G02B 5/201* (2013.01); *G02B 27/0172* (2013.01); *G02F 1/13306* (2013.01); *G02F 1/133512* (2013.01); *G09G 3/3648* (2013.01); *G09G 3/3677* (2013.01); *G09G 2300/0426* (2013.01); *G09G 2310/0262* (2013.01); *G09G 2310/0286* (2013.01); *G09G 2310/061* (2013.01); *G09G 2360/04* (2013.01)

(58) Field of Classification Search
CPC ......... G09G 2300/0426; G09G 3/3648; G09G 3/3677; G09G 2310/0286; G09G 2310/0262; G09G 2360/04; G02B 26/005; G02B 5/201; G02B 27/0172; G02F 1/13306; G02F 1/133512
USPC ........ 359/290; 345/530, 531, 534, 205, 206, 345/214, 55

See application file for complete search history.

(56) References Cited

U.S. PATENT DOCUMENTS 5,956,005 A  9/1999 Sheridon
2004/0231987 A1* 11/2004 Sterling .............. B01L 3/50273
                                                    204/450

(Continued)

FOREIGN PATENT DOCUMENTS

WO  2013087858 A1  6/2013

*Primary Examiner* — Evelyn A Lester
(74) *Attorney, Agent, or Firm* — EIP US LLP

(57) ABSTRACT

An apparatus comprises an electrowetting display device comprising: a first support plate including: a surface; and a first electrode. The apparatus further comprises a second support plate and a protrusion having a protrusion surface. The protrusion is formed as part of at least one of the first support plate or the second support plate. The protrusion has an elongate shape extending from one to the other of the first or second support plates. At least one memory and computer program instructions are configured to, with at least one processor, control a volume of the first fluid adjoining the protrusion surface and a volume of the first fluid adjoining the surface of the first support plate, by controlling a magnitude of a first voltage applied between the first and second electrodes, and by controlling a magnitude of a second voltage applied between the third and second electrodes.

24 Claims, 12 Drawing Sheets

(51) Int. Cl.
  *G09G 5/00*    (2006.01)
  *G09G 3/34*    (2006.01)
  G09G 3/36      (2006.01)
  G02B 27/01     (2006.01)
  G02F 1/1335    (2006.01)
  G02B 5/20      (2006.01)
  G02F 1/133     (2006.01)

(56) References Cited

U.S. PATENT DOCUMENTS

| | | |
|---|---|---|
| 2012/0081777 A1 | 4/2012 | Heikenfeld et al. |
| 2013/0215095 A1* | 8/2013 | Shin ........................ G09G 3/348 |
| | | 359/290 |
| 2016/0178889 A1* | 6/2016 | Massard ................ H01J 9/205 |
| | | 359/290 |
| 2016/0178890 A1* | 6/2016 | Massard .............. G02B 26/005 |
| | | 345/214 |

* cited by examiner

Controlling at least one of: a magnitude of a first voltage applied between a first electrode of a first support plate and a second electrode in electrical contact with a second fluid; and a magnitude of a second voltage applied between a third electrode and the second electrode, thereby switching a configuration of a first fluid and the second fluid, in dependence on said magnitude of the first and second voltages, and controlling a volume of the first fluid adjoining a protrusion surface of a protrusion of at least one of the first support plate or a second support plate and a volume of the first fluid adjoining a surface of the first support plate

FIG. 12

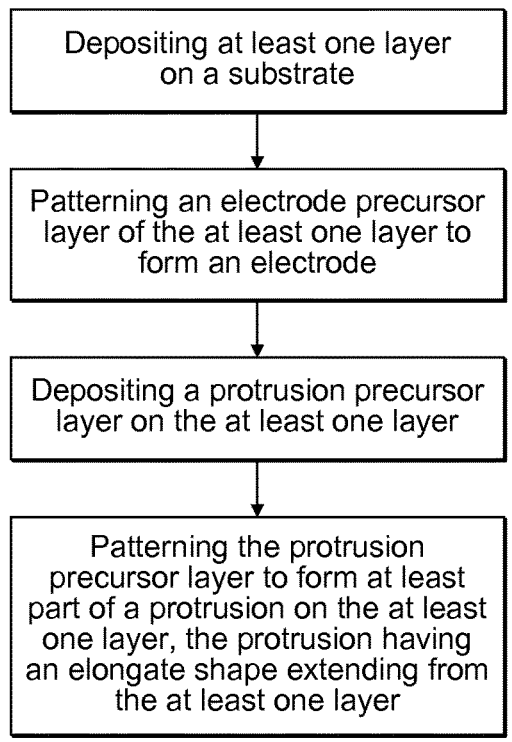

FIG. 13

ELECTROWETTING DISPLAY DEVICE WITH STABLE DISPLAY STATES

BACKGROUND

Electrowetting display devices are known. A configuration of a first and second fluid influences a display effect provided by a display element in such a device. It is known for backflow to occur. Backflow is where, despite applying a voltage for maintaining a configuration of the fluids, for example due to a capacitance of the display element, the configuration changes towards a configuration corresponding to that where no voltage is applied. This change of fluid configuration is problematic for displaying a desired display effect. Examples of known techniques for managing backflow include periodically applying a reset pulse.

It is desirable to overcome problems caused by backflow.

BRIEF DESCRIPTION OF DRAWINGS

FIG. 12 shows a method of controlling an electrowetting display device, according to examples; and FIG. 13 shows a method of manufacturing according to examples.

DETAILED DESCRIPTION

Examples will be described of an electrowetting display device having a protrusion. Although specific examples are described with reference to the FIGS., it is to be appreciated that further examples are envisaged which, although they may have some features in common with the examples of the FIGS., may have further features than those described using the FIGS. Therefore, specific examples described using the FIGS. are not to be taken as limiting and, as the skilled person will understand, certain features of examples described with the FIGS. are not limited to the specific implementation of the example of a FIG., but may be used and/or adapted for a different example, within the scope of the appended claims. For example, a shape of an electrode described below, a wettability of a surface for the first fluid or the second fluid and/or a thickness of an insulator or layer of material for example having a hydrophobic surface may be tuned to control motion of fluid within the display element.

Examples of an electrowetting display device will now be described. Such devices include a first support plate with a surface and a protrusion with a surface, otherwise referred to as a protrusion surface. Using an applied voltage, a first fluid is transferable from at least partly adjoining the surface of the protrusion to at least partly adjoining the surface of the first support plate, and vice versa. Thus, the first fluid is switchable between different configurations, for example between: a configuration with a first volume of the first fluid adjoining the surface of the protrusion and a second volume of the first fluid adjoining the surface of the first support plate; and a configuration with a third volume (less than the first volume) adjoining the surface of the protrusion and a fourth volume (greater than the second volume) adjoining the surface of the first support plate. These different configurations correspond with different display effects, for example having different greyscale levels, as will be explained further below.

Figure 1A:
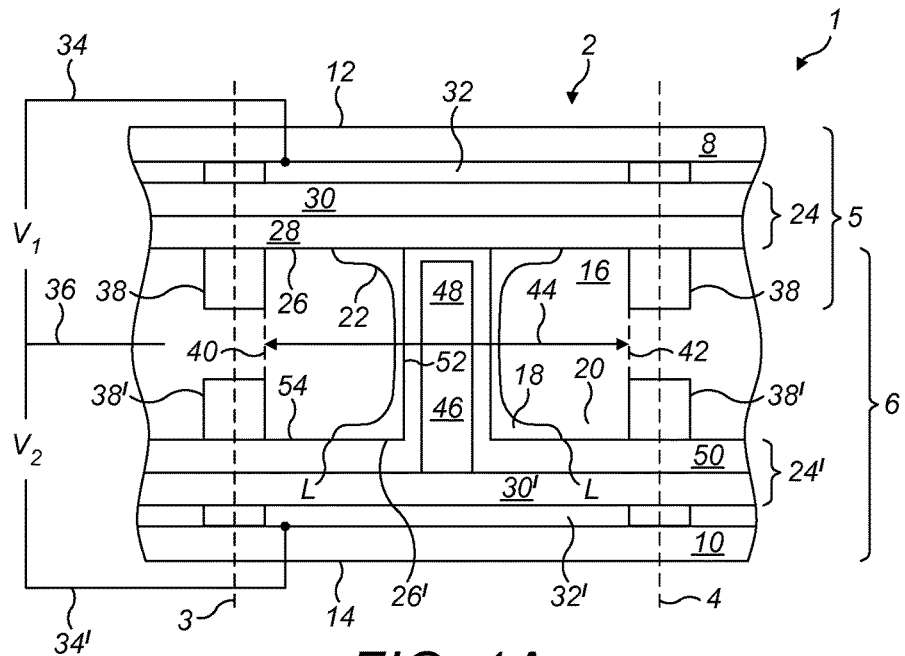
FIGS. 1A, 2A and 3A show schematically a cross-section of an example electrowetting element.

FIG. 1A shows a diagrammatic cross-section of part of examples of an electrowetting device. In this example the device is an electrowetting display device 1 including a plurality of electrowetting elements, which are picture elements 2, otherwise referred to as display elements, one of which is shown in FIG. 1A. In examples, a plurality of electrowetting elements may define a pixel for providing a display effect, each electrowetting element of the plurality being a sub-pixel for providing a sub-pixel display effect. In other examples each electrowetting element may define a pixel. The lateral dimension of the picture element of the present example is indicated in FIG. 1A by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate 8, 10 and may be rigid or flexible. The support plates in examples include further layers and/or structures than illustrated, for example circuitry for controlling the display elements. Such features are not illustrated in FIG. 1A, for example, for clarity.

The display device has a viewing side 12 on which an image or display effect can be viewed and a rear side 14. In FIG. 1A a surface of the second support plate 6, which surface is in this example a surface of the substrate 10, defines the rear side 14; a surface of the first support plate 5, which surface is in this example a surface of the substrate 8, defines the viewing side 12. The display device of FIG. 1A may have a reflective functionality, for example with the second fluid being reflective, as will be described further below. However, further examples are envisaged which comprise a protrusion in accordance with examples described herein, and which may instead be of the transmissive or transflective type. A transmissive type of display element can be considered to emit light, for example by transmitting light through the display element from a light source to a viewing side. The plurality of display elements may be monochrome. For a colour display device the display elements may be divided in groups, each group having a different colour; alternatively, an individual display element may be able to show different colours. For a colour display device, at least one of the display elements comprises a colour filter, for example a suitable layer within the first support plate, for imparting light transmitted through the colour filter with a predetermined hue for a required display effect.

A space 16, which may otherwise be considered to be a chamber, of each display element between the support plates is filled with two fluids, which in this example are liquids. In the example of FIG. 1A, the space 16 is filled with a first fluid 18 and a second fluid 20. Therefore the first and second fluids are located between the first and second support plates.

The second fluid is for example at least one of electrically conductive or polar and may be water or a salt solution such as a solution of potassium chloride in water. "Electrically conductive" for example means that the second fluid is capable of conducting electricity; for example an electrical current may flow through the second fluid due to the flow of ions for example through the second fluid. "Polar" in examples means that the second fluid comprises at least one compound (for example a liquid vehicle) having a molecule with a net dipole; i.e. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bond in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

The second fluid in the example of FIG. 1A is substantially reflective, for example the second fluid is configured to reflect at least 50% of visible light incident on the second fluid, for example, at least 60%, at least 70%, at least 80%, at least 90%, at least 95%, approximately 100% or 100% of visible light. The reflectivity of the second fluid may in examples be provided by white pigment particles dispersed and suspended in a carrier liquid (such as water or the salt solution described above). The white pigment particles may for example be titanium dioxide or an alternative white pigment compatible with a carrier liquid which is suitable for use in an electrowetting display element. In other examples, the second fluid may be transparent and may be coloured and/or absorbing.

The first fluid is at least one of non-polar or electrically non-conductive and may for instance be an alkane like decane or hexadecane or may be an oil such as silicone oil.

The second fluid is immiscible with the first fluid. Therefore, the first fluid and the second fluid do not substantially mix with each other and in some examples do not mix with each other to any degree. The substantial immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface 22, which interface defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The first fluid absorbs at least a part of the optical spectrum. The first fluid may be transmissive for a part of the optical spectrum, forming a colour filter. For this purpose the first fluid may be coloured by addition of pigment particles or a dye. Alternatively, the first fluid may be black, for example absorbing for substantially all parts of the optical spectrum, or reflecting. In examples to be described herein, the first fluid is black and therefore absorbs substantially all parts of the optical spectrum, for example in the visible light spectrum. The term "substantially absorbs" includes a degree of variation, therefore the first fluid may not absorb all wavelengths, but the majority of wavelengths within a given spectrum such as the visible spectrum, so as to perform the function of the first fluid in the element. The first fluid is therefore configured to absorb substantially all light incident on the first fluid. For example the first fluid may absorb 90% or more of light in the visible spectrum and incident on the first fluid.

In examples, such as that of FIG. 1A, the first support plate 5 includes an insulating layer 24. The insulating layer is transparent. The insulating layer 24 may extend between walls of a picture element. To avoid short circuits between the second fluid 20 and electrodes arranged under the insulating layer, layers of the insulating layer may extend uninterrupted over a plurality of picture elements 2, as shown in FIG. 1A. The insulating layer has a surface 26 facing the space 16 of the picture element 2. The surface 26 is therefore a surface of the first support plate at least partly adjoined by at least one of the first or second fluids, which surface provides a display area over which a display effect is controlled. The thickness of the insulating layer may be less than 2 micrometers and may be less than 1 micrometer.

In examples, the insulating layer may be a single layer, for example formed of a hydrophobic material; alternatively, as shown in FIG. 1A, it may include a hydrophobic layer 28 and a barrier layer 30 with predetermined dielectric properties, the hydrophobic layer 28 facing, for example closest to, the space 16, as shown in FIG. 1A. The hydrophobic layer is schematically illustrated in FIG. 1A and may be formed of Teflon®AF1600. The barrier layer 30 may have a thickness, taken in a direction perpendicular the plane of the substrate, between 50 nanometers and 500 nanometers and may be made of an inorganic material like silicon oxide or silicon.

Each display element 2 includes an electrode 32 as part of the first support plate 5, otherwise referred to herein as the first electrode. The electrode is associated with, for example overlaps, the surface of the support plate providing the display area. In examples shown there is one such electrode 32 of the first support plate per display element. The electrode 32 is separated from the fluids by the insulating layer 24; electrodes of neighbouring picture elements are each separated from each other by a non-conducting layer.

In some examples, further layers may be arranged between the insulating layer 24 and the electrode 32. The electrode 32 can be of any desired shape or form. The electrode 32 of a picture element is supplied with an electrical potential signal by a signal line 34, schematically indicated in FIG. 1A. A second signal line is connected to an electrode 36 (referred to herein as a second electrode) that is in electrical contact with the second fluid 20, so that charge can flow from the electrode to the second fluid. This electrode may be common to all elements, when they are fluidly interconnected by and share the second fluid, uninterrupted by walls.

In examples, for example that of FIG. 1A, the first fluid 18 is confined to adjoin a display area of the display element by at least one wall, in this example walls 38 that follow the cross-section of the picture element. The cross-section of a picture element may have any shape; when the picture elements are arranged in a matrix form, the cross-section is usually square or rectangular, but in other examples different cross-sectional shapes are envisaged. It is noted that although in examples described a plurality of walls follow the cross-section of the picture element and confine the first fluid to adjoin the display area, in other examples there may be one continuous wall surrounding the display area.

Although the walls are shown as structures protruding from the insulating layer 24, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1A. The dimension of the picture element, indicated by the dashed lines 3 and 4, is defined by the centre of the walls 38. The area of the surface 26 between the walls of a picture element, indicated by the dashed lines 40, 42, is called the display area 44, over which a display effect occurs and which is adjoined by the first fluid where the surface is not also adjoined by the protrusion described later. The display effect depends on a size of area that the first and second fluids adjoin the surface defined by the display area, in dependence on the magnitude of an applied voltage V as will be described in due course. The magnitude of a voltage V applied between the first and second electrodes 32, 36 and between third and second electrodes 32',36 therefore determines the configuration of the first and second fluids within the element and is used to control the fluid configuration.

In examples, such as that of FIG. 1A, the second support plate 6 has a similar construction to that of the first support plate. Features of the second support plate which are similar to those of the first support plate are labelled in FIG. 1A with the same reference numerals marked with '. For example, the second support plate comprises an electrode 32' (referred to elsewhere herein as the third electrode) which is similar to the electrode 32 of the first support plate, though in other examples a shape, the electrical properties and/or the material of the electrodes may be different for each electrode. In examples, the third electrode forms part of the second support plate and overlaps the protrusion, for example a lateral extent of the third electrode overlaps a lateral extent of the protrusion. Descriptions of features of the first support plate should be taken to apply for the corresponding features of the second support plate. Differences between the first support plate and the second support plate will therefore now be described.

In examples, for example that of FIG. 1A, the display element comprises a protrusion. In the example of FIG. 1A the protrusion 46 is formed as part of the second support plate 6 (and hence the bracket in FIG. 1A extends to include the protrusion 46 but doesn't include the walls 38 of the first support plate).

A protrusion described herein is a formation which protrudes from at least one of the first or second support plates and is formed as part of at least one of the first or second support plates. In the example of FIG. 1A the protrusion protrudes from the second support plate and extends to contact the surface 26 of the first support plate. In other examples however the protrusion is instead formed as part of the first support plate or as part of both of the first and second support plates.

Many different forms of the protrusion are envisaged for different examples. For example, as illustrated in FIG. 1A, but envisaged for other examples too, the protrusion has an elongate shape, for example is an elongate element, which extends from a respective one of the first or second support plates to a respective other of the first or second support plates; for example the protrusion extends from the second support plate in a direction substantially perpendicular to a plane of the surface 26', e.g. perpendicular within manufacturing tolerances. The protrusion may be considered to be a structure, a post, a column, or a pillar, for example. In examples, the protrusion may have a greater height than width, though in other examples may be wider than the height of the protrusion. The protrusion for example occupies less than 50%, for example less than 40%, less than 30%, less than 20% or less than 10%, of the surface of the first support plate adjoined by at least one of the first or second fluids. Therefore, the protrusion occupies, for example has a footprint covering, a relatively minor area of the surface for adjoinment by the first and/or second fluids. A cross-section of the protrusion, taken in a plane parallel the plane of the surface 26' of the second support plate, is for example circular or square, though other shapes are envisaged. Further, a shape and size of such a cross-section may be substantially constant along the length of the protrusion, for example constant within acceptable manufacturing tolerances, though in other examples the shape or size may change along the length of the protrusion as will be explained with an example using FIGS. 4 and 5 below. The dimensions of the protrusion are for example designed for the protrusion to sufficiently perform its function for example as a conduit for guiding flow of the first fluid, as will be described in further detail below. Further, the location of the protrusion within the lateral extent of the display element may be different for different examples. The location may for example be selected to improve the first fluid conduit properties; for example, the protrusion may be located substantially centrally relative to the surface 26', e.g. central within acceptable manufacturing tolerances, so that flow of first fluid to and from the display area of the first support plate 5 is uniform around the protrusion. This is an example of the protrusion being separated from the at least one wall by at least one of the first or second fluids; for example laterally from the protrusion there is at least one of the first or second fluids between the protrusion and the at least one wall. The protrusion may therefore be located within the display area.

In the example of FIG. 1A, the protrusion 46 is an elongate element formed on the barrier layer 30' and located substantially centrally relative to the lateral extent of the display element. The protrusion is formed as part of the second support plate. In this example the protrusion 46 has a circular cross-section. In examples such as that of FIG. 1A the protrusion extends from the second support plate and contacts the surface 26 of the first support plate. By contacting the surface, the protrusion may additionally act as a spacer for reducing deformation of at least one of the first or second support plates.

In examples, the protrusion may be formed of a single material for example a hydrophobic material. In other examples, for example that of FIG. 1A, the protrusion is formed of an elongate structure 48 and a hydrophobic layer 50 covering the elongate structure 48. The elongate structure is for example formed on a layer of at least one layer of one of the first or second support plates. The hydrophobic layer 50 for example also covers a surface of the layer of the at least one of the first or second support plates; for example, in FIG. 1A the hydrophobic layer also covers the insulating layer 30' of the second support plate and therefore is a continuous hydrophobic layer of the second support plate which provides the surface 26' of the second support plate and a surface of the protrusion 52 for adjoinment by at least one of the first or second fluids. Thus in FIG. 1A, the protrusion is formed as part of the second support plate. The hydrophobic layer in examples has a substantially uniform thickness, for example uniform within acceptable manufacturing tolerances.

In examples, the surface of the protrusion is formed of a material which has a lower wettability for the first fluid than the surface of the first support plate without a voltage applied. Therefore, in FIG. 1A, the surface of the protrusion 52 is less wettable for the first fluid than the surface 26 of the first support plate without a voltage applied; as will be explained more later, this means the first fluid is switchable to adjoin the surface of the protrusion and/or the surface of the first support plate. The surface of the protrusion in examples lies out of the plane of the surface 26' of the second support plate; therefore, for example, a surface of the protrusion could be considered to lie in a plane which is perpendicular to a plane of the surface of the second support plate.

It is to be noted that a wettability of a surface of a material may change when a voltage is applied across the surface, due to an electrowetting effect on the surface of the material. Therefore, although the inherent wettability property of the material does not change with or without application of a voltage, the wettability of the surface of the material may temporarily change, when a voltage is applied across the surface, from the inherent wettability to a different wettability which for example is less wettable for the first fluid and is therefore for example more wettable for the second fluid. At various points below in the description therefore, a wettability of a surface is referred to in the context of no or without a voltage being applied; this intends to describe an inherent wettability property of the material having the surface, without the influence of the electrostatic charge on the surface.

Wettability relates to the relative affinity of a fluid for a surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties. In examples described herein, a surface which is wettable by the first fluid forms a contact angle at the fluid-solid boundary within the range 1 to 119 degrees, the angle being represented by an arc drawn within the first fluid (not shown).

Despite the surface of the protrusion (for example surface 52 in FIG. 1A) being less wettable for the first fluid than the surface of the first support plate (for example surface 26 of FIG. 1A), both the surface of the first support plate and the surface of the protrusion are each for example wettable by the first fluid, without a voltage applied, and for example are each hydrophobic (with a tendency to repel to water). The wettability of the surface of the protrusion, the wettability of the surface of the first support plate and therefore the difference in wettability therebetween is selected to enable control of transferring first fluid between adjoining the surface of the protrusion and the surface of the first support plate and to enable a configuration of the first and second fluids to remain substantially maintained after application of a voltage. This will be explained in further detail below.

In examples with the second support plate comprising the protrusion, for example that of FIG. 1A, a surface of the second support plate for adjoinment by at least one of the first or second fluids comprises the surface of the protrusion 52 and a further surface 54. The further surface is for example formed of a material which has for example, without a voltage applied, a lower wettability for the first fluid than the surface of the protrusion and may in some examples be hydrophilic. The further surface is for example part of the surface 26' of the second support plate but having a lower wettability for the first fluid without a voltage applied such that the first fluid tends not to wet the further surface. The further surface in FIG. 1A for example surrounds and adjoins an other part of the surface 26' of the second support plate which adjoins the surface of the protrusion 52. Thus, a line L formed where the further surface 54 adjoins the other part of the surface 26' of the second support plate delimits, for example marks, an extent of adjoinment of the surface of the second support plate which is wettable by the first fluid. In other words, the line L indicates the change of wettability between the further surface 54 and the surface 26' of the second support plate which limits, for example prevents or blocks, the first fluid from spreading across more of the surface of the second support plate than desired. The line therefore for example acts as a perimeter of an extent of the surface of the second support plate which is wettable by the first fluid. For example, the line L defines a maximum extent of the surface of the second support plate that can be wet by the first fluid. In examples, for example that of FIG. 1A, the further surface 54 is hydrophilic whereas the other part of the surface of the second support plate is hydrophobic. The surface of the protrusion adjoining the other part of the surface of the second support plate has for example the same wettability for the first fluid as the other surface. The surface of the protrusion and the other part of the surface of the second support plate therefore for example form a single surface with the same wettability for the first fluid.

The line may be linear or non-linear, for example circular so as to surround a lateral extent of the protrusion. The location of the line L can be selected when designing an electrowetting display device in accordance with for example at least one of the volume of the first fluid, the dimensions of the space for example or the desired switching properties of the fluids. Therefore in different examples the position of the line L may be different than shown in FIG. 1A. For example, the further surface may adjoin the surface of the protrusion without another part of the surface of the second support plate in between; an example of such an example is described later using FIGS. 6 and 7. With the further surface adjoining the surface of the protrusion, the surface of the second support plate and therefore the further surface may for example in some examples have the same wettability as the surface of the protrusion. In other examples, the further surface may have a greater wettability to the first fluid than the wettability of the surface of the protrusion and may for example be hydrophobic; in such examples the surface of the protrusion may be hydrophobic or in some examples hydrophilic.

In other examples, there may be no such further surface. Instead, a surface of the second support plate comprises the surface of the protrusion and extends from the protrusion to the at least one wall 38' which surrounds the protrusion. For example, a surface of the at least one wall 38' of the second support plate which is closest to the protrusion has, without a voltage applied, a lower wettability for the first fluid than the surface of the second plate. For example, the surface of the at least one wall may be hydrophilic and the surface of the second support plate excluding the surface of the at least one wall is hydrophobic. A line where the surface of the at least one wall meets, for example adjoins, the surface of the second support plate therefore acts in a similar manner as the line L described previously, by limiting an extent of spreading of the first fluid on the surface of the second support plate.

Figure 1B:
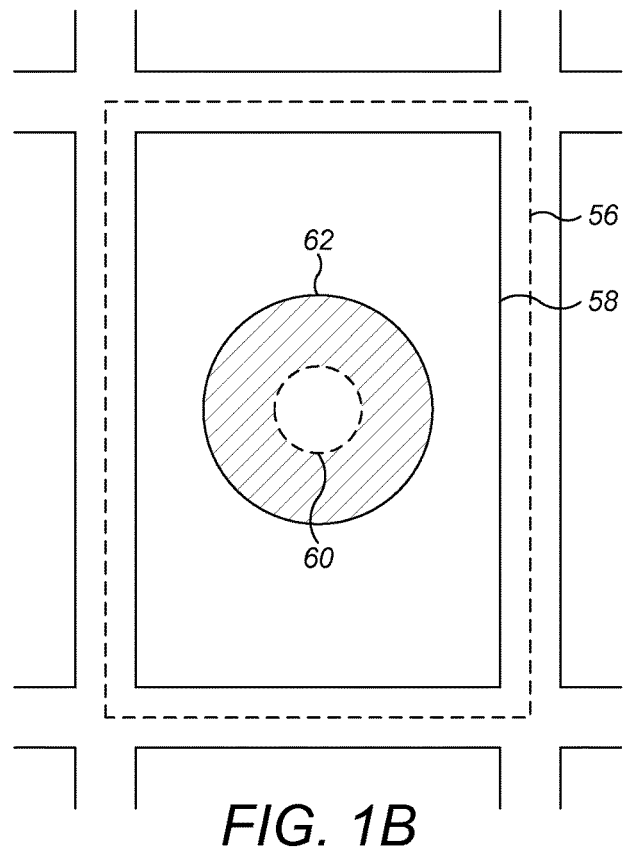
FIGS. 1B, 2B and 3B show a plan view of the example electrowetting element.

FIG. 1B shows a matrix of rectangular picture elements in a plan view of the first support plate. The dimension of the central picture element in FIG. 1B, corresponding to the dashed lines 3 and 4 in FIG. 1A, is indicated by the dashed line 56. Line 58 indicates the inner border of a wall; the line is also the edge, for example a perimeter, of the display area 26. A dashed line 60 indicates the lateral extent of the protrusion 46.

Referring to FIGS. 1A and 1B, an area of adjoinment of the surface 26 of the first support plate by the first fluid 18 is shown by the diagonal hatching. Therefore, the perimeter of the first fluid adjoining the surface 26 of the first support plate is shown by line 62. As will be appreciated, with the first fluid adjoining less than all of the display area, where the first fluid is for example black as explained above, light may pass into the display element through the viewing side 12, be reflected by the second fluid, and then exit through part of the display area of the first support plate not adjoined by the first fluid. Depending on the size of area of the display area adjoined by the first fluid, a different display effect may be provided by the display element, depending on the amount of light which can exit the display element through the display element. Thus, the controllable configuration of the first fluid, is used to operate the display element as a light valve, providing a display effect over the display area.

Examples of controlling a configuration of the first and second fluids, for controlling a display effect provided by the display element, will now be described further. FIG. 12 also illustrates a method of controlling an electrowetting display device according to examples described herein.

In examples, the configuration of the first and second fluids is switchable using a voltage applied between at least one of the first, second or third electrodes. Thus, a volume of the first fluid adjoining the protrusion surface and a volume of the first fluid adjoining the surface of the first support plate is controllable by controlling a magnitude of a first voltage applied between the first and second electrodes and by controlling a magnitude of a second voltage applied between the third electrode and the second electrode. The configuration of the first and second fluids illustrated using FIGS. 1A and 1B is one example. Further configurations of the first and second fluids are obtainable in dependence on application of at least one of a first voltage V1 between the first and second electrodes or a second voltage V2 between the third and second electrodes. This will now be demonstrated with reference to FIGS. 2A, 2B, 3A and 3B.

Figure 2A:
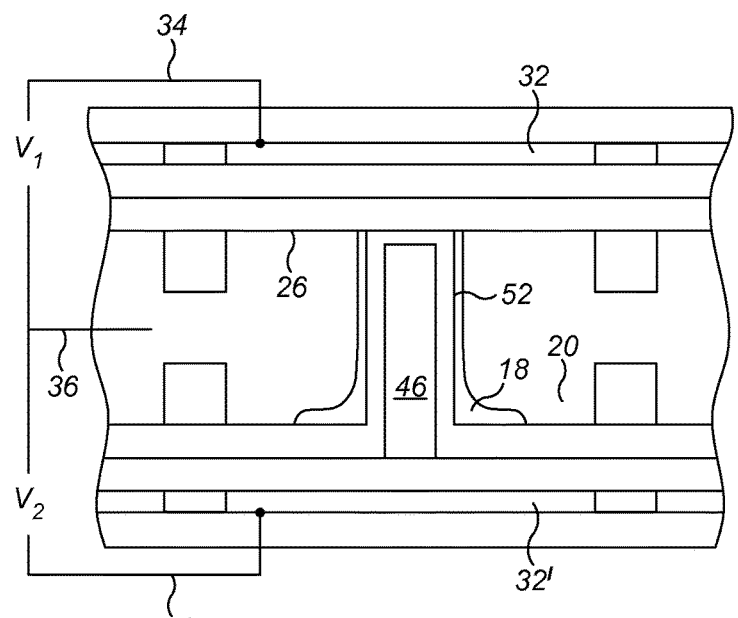
Figure 2B:
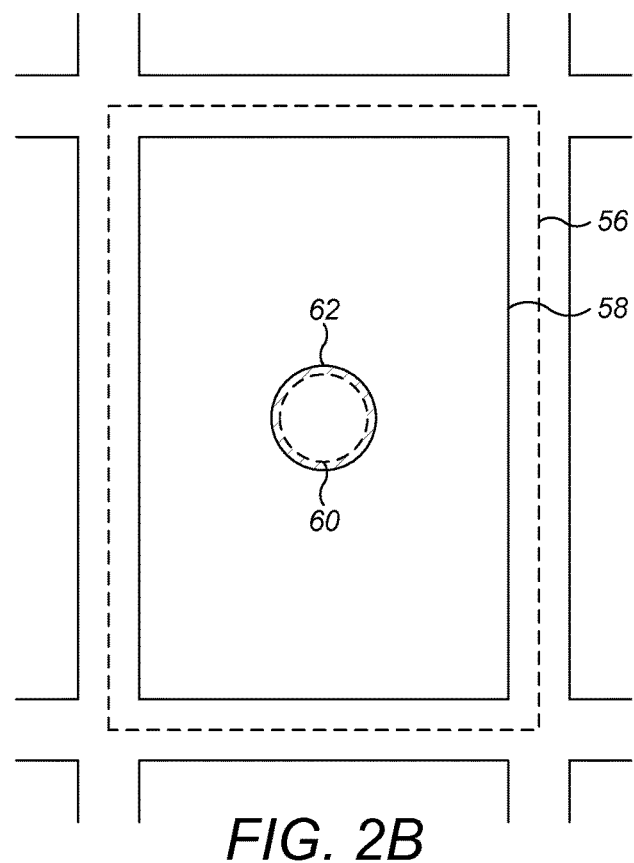
Figure 3A:
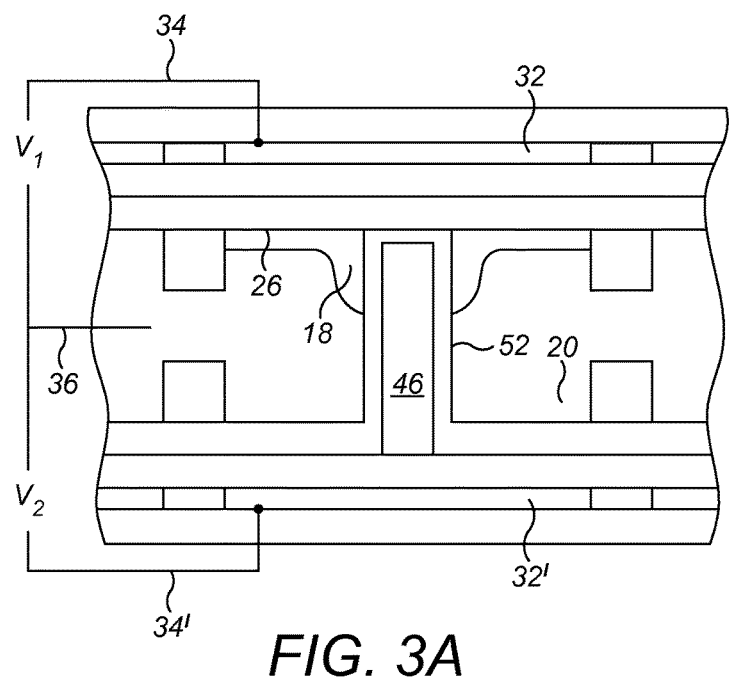
Figure 3B:
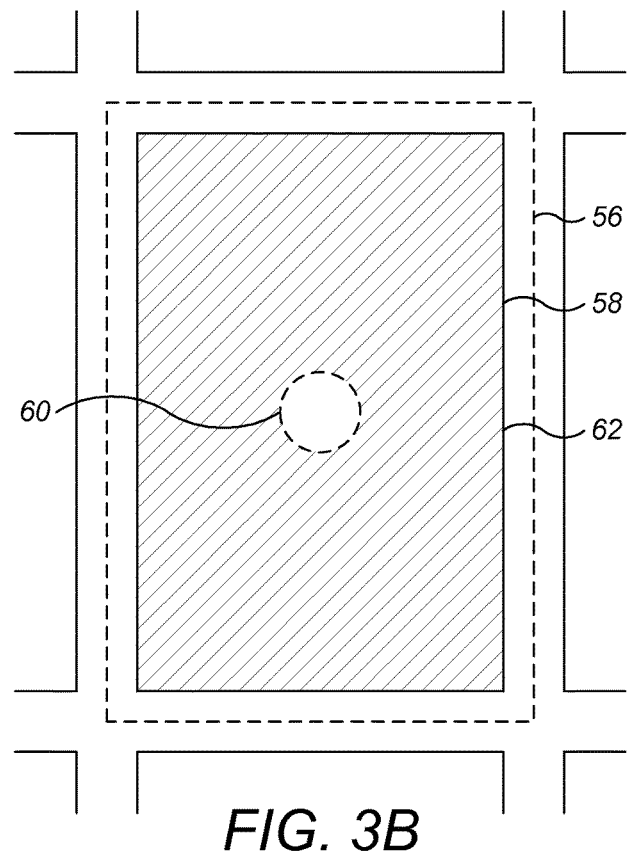

FIGS. 2A and 3A show the same display element as FIG. 1A except with a different configuration of the first and second fluids. The same is true for FIGS. 2B and 3B showing the same display element as FIG. 1B. The same reference numerals are therefore used in these FIGS.

FIGS. 2A and 2B show an example of a first configuration of the first and second fluids. This configuration in this example corresponds with a brightest display effect providable by the display element. In other words, the first fluid is configured to adjoin a minimum area of the display area (within switching parameters controlled by a display device control subsystem for example, described later). This is shown by FIG. 2B by the diagonal hatching.

FIGS. 3A and 3B show an example of a second configuration of the first and second fluids. This configuration in this example corresponds with a darkest display effect providable by the display element. In other words, the first fluid is configured to adjoin a maximum area of the display area. This is shown by FIG. 3B by the diagonal hatching.

In examples, for example that of FIGS. 1A to 3B, with the first and second fluids being in the first configuration, a first volume of the first fluid adjoins the surface 52 of the protrusion and a second volume of the first fluid adjoins the surface 26 of the first support plate; and with the first and second fluids being in the second configuration, a third volume of the first fluid adjoins the surface 52 of the protrusion and a fourth volume of the first fluid adjoins the surface 26 of the first support plate. The third volume is less than the first volume and the fourth volume is greater than the second volume. The first fluid in examples may also adjoin further of the surface of the second support plate than the protrusion surface.

By controlling application of the first and second voltages, for example at least one of the magnitude or the duration of applying the first voltage and/or the second voltages, the first fluid is transferable between adjoining a part of the surface of the protrusion and adjoining a part of the surface of the first support plate. Thus, the first and second fluids are switchable between the first and second configurations.

It is noted that where the first fluid is described as adjoining a surface, or a part of a surface, this refers to a part of the first fluid which is on the relevant surface; "on" is not limited for example to adjoining the surface but also to a further volume of the first fluid which itself does not adjoin the surface but which is supported on the relevant surface.

As explained above, the difference between the wettability of the surface of the protrusion and the surface of the first support plate is selected to enable control of transferring the first fluid. For example, with the surface of the protrusion having a lower wettability for the first fluid than the surface of the first support plate, the first fluid may have a preference to wet the surface of the first support plate over wetting the surface of the protrusion. However, with both the surface of the protrusion and the surface of the first support plate having a wettability for the first fluid, without an applied voltage for the first fluid, a configuration with part of the first fluid adjoining the surface of the first support plate and part of the first fluid adjoining the surface of the protrusion, remains substantially unchanged after application of the first and/or second voltages, for example after removing at least one of the first or second voltages, for example without a voltage being applied between anyone of the first, second or third electrodes. Substantially unchanged for example is where the display effect from the configuration of first and second fluids is perceived as unchangeable by a viewer. This unchanged display effect may continue until a different configuration of the first and second fluids is required for a different display effect. The configuration may therefore remain unchanged for longer than a time taken in known devices for an oil to move due to backflow. The period of time which the configuration may remain unchanged for may in examples be in the order of days, weeks, months or longer. In this way, the display element may be considered to provide multiple stable display states for which the configuration of the first and second fluids remains substantially unchanged without for example the problem of backflow occurring. This therefore obviates the need to use backflow reducing or compensating techniques known from the art, some of which may use power to implement, for example periodically applying a reset signal.

To change the configuration of the first and second fluids, for example to move first fluid from adjoining the surface of the protrusion to adjoin the surface of the first support plate, the first voltage V1, which is applied between the first electrode and the second electrode, is set with a lower magnitude, for example a zero magnitude (i.e. V1=0V), than the second voltage V2 (with a non-zero magnitude) which is applied between the second electrode and the third electrode. This covers the possibility that the second voltage V2 may be set with a greater magnitude than the first voltage V1. Thus, for example, the first and second fluids can be switched from the first configuration (as shown for example in FIG. 2A) to the second configuration (as shown for example in FIG. 3A). The specific magnitude and duration of applying each of the first and second voltages is selected to enable the switching between fluid configurations, in dependence on the parameters of the display element, for example the wettabilities of the surface of the protrusion and the surface of the first support plate and the volumes of first fluid and second fluid in the display element.

To change the configuration of the first and second fluids, for example to move first fluid from adjoining the surface of the first support plate to adjoin the surface of the protrusion, the first voltage V1 is set with a greater magnitude (a non-zero magnitude) than the second voltage V2 which for example has a zero magnitude (i.e. V2=0V). This covers the possibility that the second voltage V2 may be set with a lesser magnitude than the first voltage V1. The specific magnitude and duration of applying the first and second voltages is similarly dependent on display element parameters as explained earlier. A zero voltage is equivalent to not applying a voltage, for example without application of a voltage between two electrodes.

Thus, by appropriate control of setting the first and second voltages, the first and second fluids can be selectively switched to one of the first and second configurations. Moreover, with appropriate selection of the magnitude of and the duration of applying at least one of the first or second voltages, a rate of switching a configuration of the first and second fluids, involving transferring the first fluid from a respective one to a respective other of the surface of the protrusion and the surface of the first support plate, may be controlled, for example with a predetermined or preset rate of switching the configuration of the first and second fluids.

With appropriate application of at least one of the first or second voltages, the first fluid can be considered to be pushed away from either the surface of the protrusion or the surface of the first support plate. The surface of the protrusion can therefore be considered to act as a reservoir for the first fluid. Depending on the magnitude of the first and second voltages, a voltage gradient may be set up in favour of a direction of movement of the first fluid (e.g. from the protrusion to the first support plate or vice versa). The magnitude of the gradient and therefore the rate of first fluid flow depends for example on the specific magnitude of each of the first and second voltages.

In examples, to assist "pushing" of the first fluid to the desired surface, the voltage with greater magnitude should in examples be applied across the first fluid. Therefore, for transferring the first fluid from the protrusion to the surface of the first support plate, the first fluid in the first configuration may be located between the second fluid (to which an electric potential is applied by the second electrode) and the third electrode. Thus, the line L delimiting the extent of spreading of the first fluid on the surface of the second support plate may be located between the second fluid and the third electrode so that the second voltage can be applied across part of the first fluid. With the second voltage being appliable across the line L for example, a force for moving the first fluid is applied at the interface of the first and second fluids with the surface of the second support plate. Therefore, the force is applied at the edge of the volume of the first fluid to assist pushing the first fluid towards the surface of the first support plate.

As explained above, examples described herein exhibit multiple stable configurations of the first and second fluids. This is possible for example by at least one memory and computer program instructions being configured to, with at least one processor substantially maintain one of the first or second configuration of the first and second fluids until a different configuration of the first and second fluids is required for providing a different display effect. This is done for example by withholding, for example not, applying a voltage, such as a further first voltage, between the first and second electrodes and withholding applying a voltage, for example a further second voltage, between the third electrode and the second electrode, during a period between applying the first voltage and applying the second voltage to set one fluid configuration and then applying the further first voltage and the further second voltage to switch the first and second fluids to a different configuration.

Further details of circuitry for controlling switching of the configuration of the first and second fluids will now be described.

Figure 4:
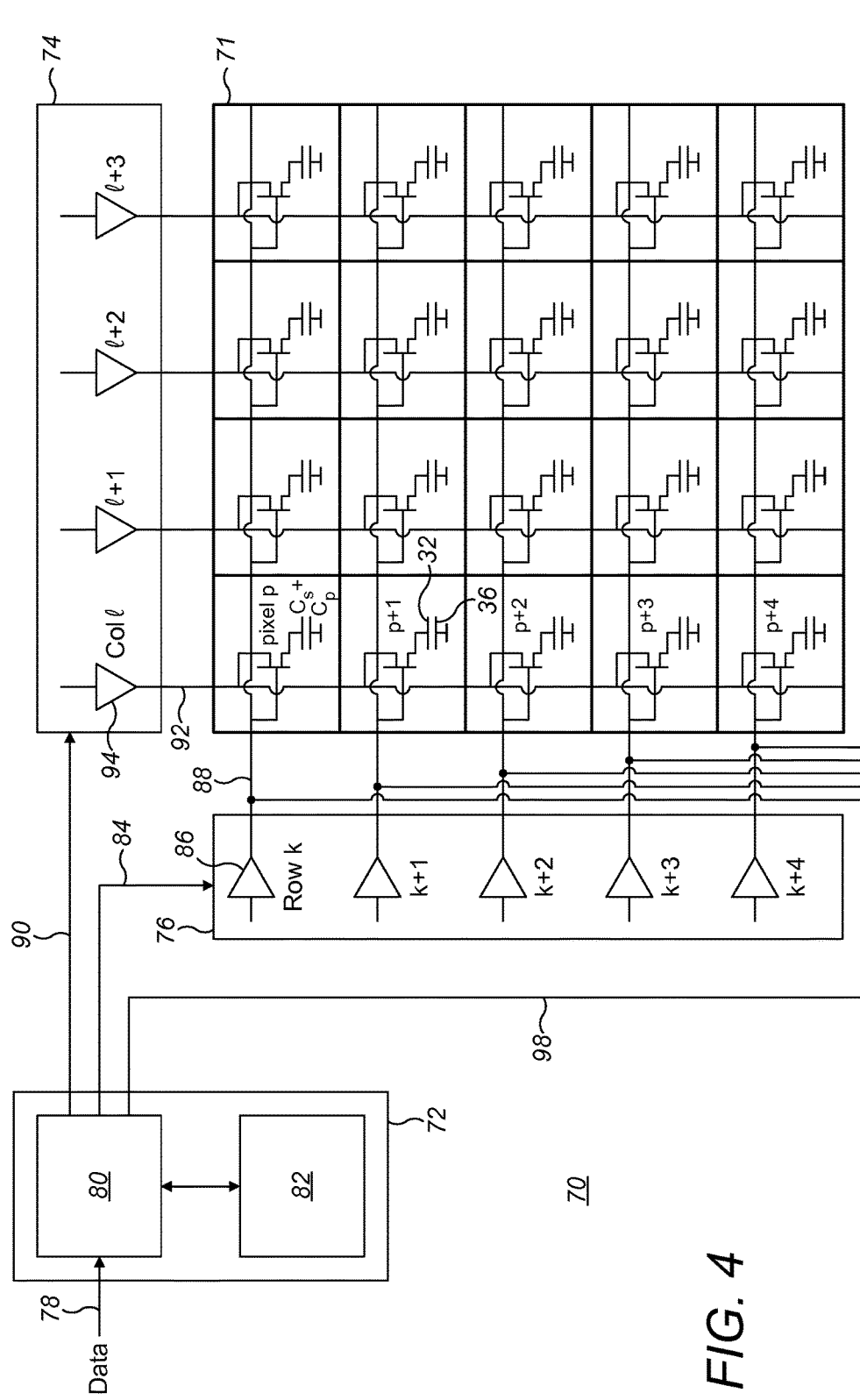
FIG. 4 shows schematically circuitry for controlling the example electrowetting element.
Figure 4:
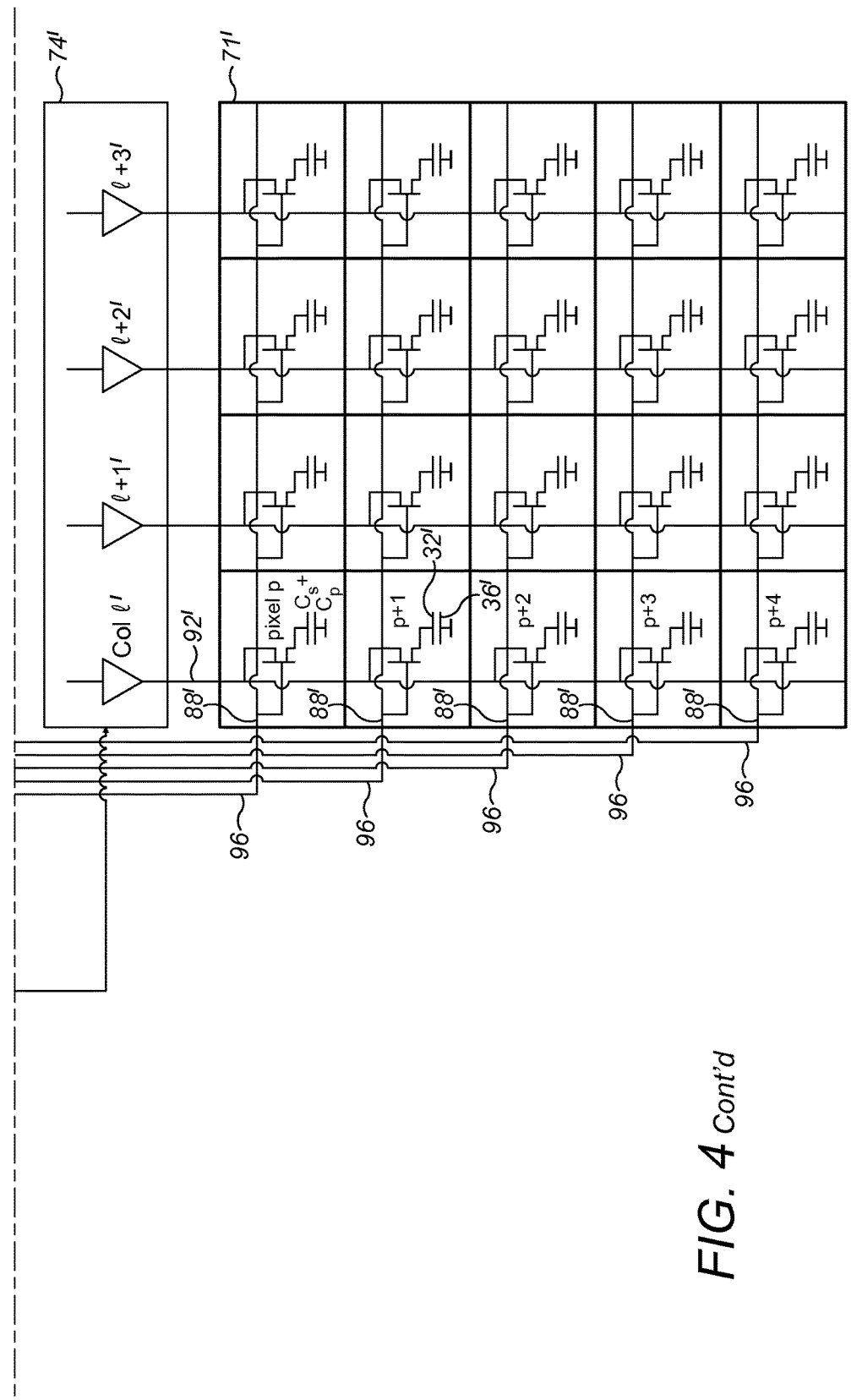

FIG. 4 shows schematically an example of parts of a system such as a portable apparatus 70. Further details of such an example are explained further below. The apparatus includes an electrowetting display device such as that described in examples above. The electrowetting display device comprises a plurality of a display element of an example described herein with a protrusion. Therefore each respective display element of the plurality of display elements, for example at least a first display element and a second display element, comprises a respective one of: the surface of the first support plate, the surface of the second support plate, the protrusion, the first fluid, the second fluid, the first electrode and the third electrode.

In this example the plurality of display elements are arranged in a matrix layout and are controlled using a so-called active matrix driving technique as the skilled person will appreciate. It is to be appreciated that in other examples a passive matrix technique may be used, again known to the skilled person, for example with a dedicated driver per display element for applying a voltage to that display element. In such examples the display area may correspond with a segment of an image displayable by the device.

Returning to the examples using active matrix driving, for example as shown in FIG. 4, each of the first and second support plates include active matrix circuitry for controlling applying the first and second voltages V1, V2 respectively. There is a display driving system and a display device such as the electrowetting display device described above. The display driving system is for example part of a display device control subsystem described later and in this example includes a display controller or controller 72, a display row driver 76 for the first support plate and a display column driver 74 for the first support plate. Data indicative of display states of the display elements, the display states for example representing a still image or video images, for example display effects, is received via an input line 78 to the display driving system. The display controller includes at least one processor 80 for processing the data received via the input line 78. The processor is connected to at least one memory 82. The display controller prepares the data for use in the display device. The at least one memory may store computer program instructions that are configured to cause the display apparatus to perform one or more of the methods of controlling a display device as described when being executed by the processor. The computer program instructions may be stored on a computer program product including a non-transitory computer-readable storage medium. An output of the processor 80 is connected by line 84 to the display row driver 76, which includes row driver stages 86 that transform signals to the appropriate voltages for the display device. Row signal lines 88 connect the row driver stages to respective rows of the display device for transmitting the voltage pulses generated in the display row driver to display elements in each row of the display device, thereby providing a row addressing signal to each row of the display device. In other words, one or more voltage pulses for addressing one or more rows is transmitted over the row signal lines 88 corresponding to the rows to switching elements corresponding respectively to the display elements in the one or more rows. The display row driver 76 generates the voltage pulses used for addressing the rows of the display device, using information from the processor 80 to set a value of the pulse duration of the voltage pulses. Another output of the processor 80 is connected by line 90 to the display column driver 74, which includes column driver stages 94 that transform signals to the appropriate voltages for the display device. Column signal lines 92 connect the column driver stages to the columns of the display device, providing a column signal to each column of the display device. The display controller 72 determines which rows are selected for addressing and in which order. The selected rows are consecutively addressed by applying an addressing signal to each of these rows.

The addressing may include the steps of determining a value for a first pulse duration corresponding to at least one voltage pulse to be applied to a row of display elements, generating the at least one voltage pulse having the first pulse duration and transmitting the at least one voltage pulse to the rows to be addressed. In examples where the display elements of a row are connected to the same row signal line, addressing a row means addressing each display element of that row. When a display element is being addressed, the display element admits the column signal that is applied to the column signal line to which the display element is connected. The column signal for a display element is applied substantially simultaneously with the voltage pulse used for addressing the display element. Substantially simultaneously means for example that the column signal is present on the column signal line for at least the pulse duration of the voltage pulse. The display drivers may comprise a distributor, not shown, for distributing data input to the display driver over a plurality of outputs connected to the driver stages. The distributor may be a shift register. FIG. 4 shows the signal lines only for those columns and rows of the display device that are shown in the FIG. The row drivers may be integrated in a single integrated circuit. Similarly, the column drivers may be integrated in a single integrated circuit. The integrated circuit may include the complete driver assembly. The integrated circuit may be integrated on the substrate 8 or the substrate 10 of the display device. The integrated circuit may include part or the entire display device control subsystem. The display device comprises a plurality of display elements arranged in a matrix of n rows, where n may be ≥2, i.e. larger than one. The matrix may have an active matrix configuration. The matrix may have m columns, where m may be ≥2; the total number of display elements in this example is n×m. FIG. 4 shows display elements for five rows, labelled k to k+4 and four columns labelled l to l+3. The total number of rows and columns for common display devices may range between a few hundred and a few thousand. The display elements, also referred to as pixels in FIG. 4 (but which in other examples may be sub-pixels) of column l are labelled p to p+4. Each display element may have the same construction as the display element 2 in FIG. 1A. FIG. 4 shows a few electrical parts of the display elements. Each display element of the display device includes an active element in the form of one or more switching elements. The switching element may be a transistor, for example a thin-film transistor (TFT), or a diode. The first and second electrodes of the display element are indicated as a pixel capacitor Cp. A line connecting the second electrode of the capacitor to ground is the common signal line (36 of FIG. 1) and the line connecting the first electrode of the capacitor to the transistor is the signal line 34 shown in FIG. 1. The display element may include a capacitor Cs for storage purposes or for making the duration of the holding state or the voltage applied to the element uniform across the display device. This capacitor is arranged in parallel with Cp and is not separately shown in FIG. 3. The column drivers provide the signal levels corresponding to the input data for the display elements. The row drivers provide the signals for addressing the row of which the elements are to be set in a specific display state. In examples, addressing a row means applying a signal on the signal line of the row that switches a transistor of each of the display elements of the row to a conducting state of the transistor. Each row of the n rows of the display device is addressable by a signal such as a voltage pulse; the voltage pulse is applied to a switching element of each of the display elements in the addressed row for switching the switching element.

The addressing of rows is part of the addressing of display elements in an active matrix display device. A specific display element is addressed by applying a voltage to the column in which the specific display element is located and applying a voltage pulse to the row in which the specific display element is located. When the transistor of a display element receives at its gate a voltage pulse of its row addressing signal, the transistor becomes conducting and it passes the signal level of its column driver to the electrode 32 of the display element. In examples, a voltage pulse is a rapid, transient change in the voltage from a baseline value to a higher or lower value, followed by a rapid return, for example a change, to the baseline value. The time period between the two subsequent voltage changes of the voltage pulse is called a pulse duration. After the transistor has been switched off, so the transistor is no longer conducting, the voltage over the cell will be maintained within acceptable tolerances until the transistor is switched on again by the next row addressing signal for the display element. In this active matrix driving method the electrodes of the electrowetting cells are connected to the driving stages briefly at the start of a period during which they show a certain display effect. During this connection, a voltage related to the desired display effect is applied to the electrodes. After the display element is disconnected from the driver stage, the voltage on the electrodes is maintained within acceptable tolerances by one or more capacitors during the period during which the display element shows the display effect. The method is called 'active', because the display element contains at least one active element, for example a transistor.

Figure 5:
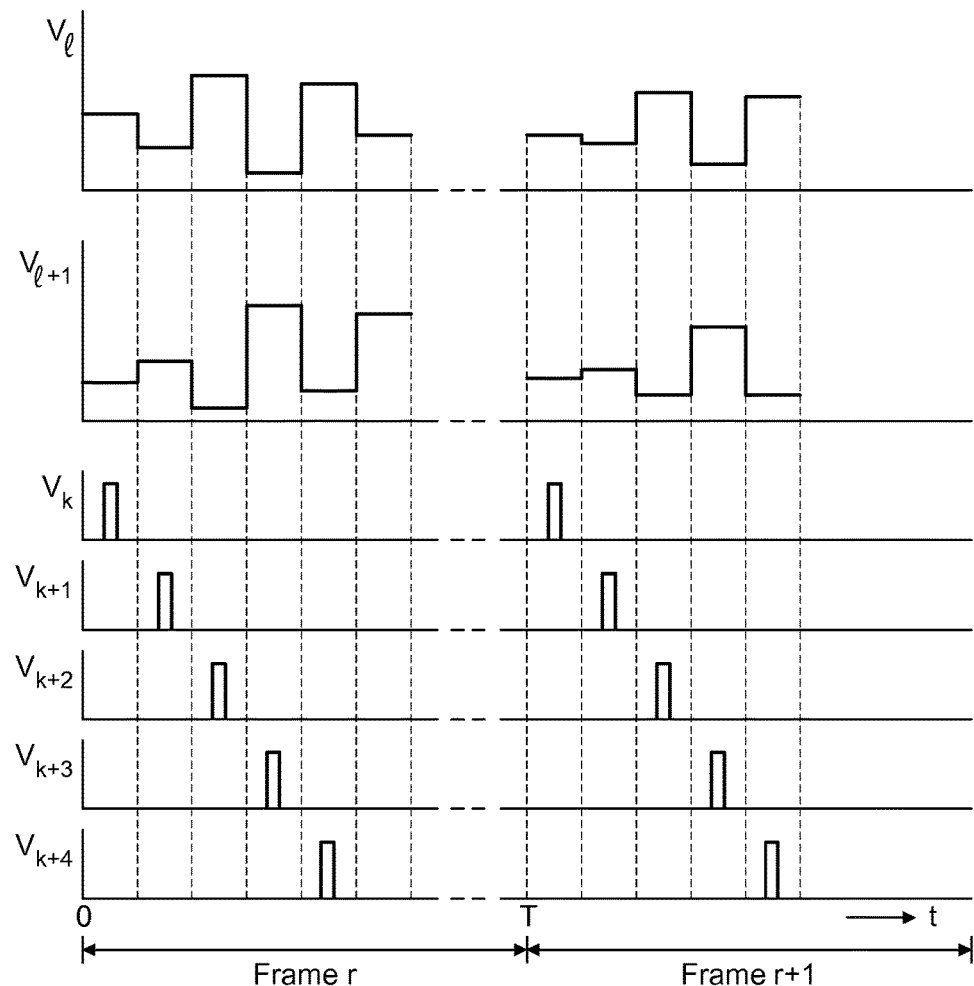
FIG. 5 shows schematically a method for controlling the example electrowetting element.

FIG. 5 shows a diagram of an example method of driving the display elements in a display device having an active matrix configuration. The method displays images during a series of frames, for example, an image is displayed within the duration of one frame. During a frame all display elements of a display device may be addressed; in a matrix all rows of the matrix of a display device are addressed during a frame. FIG. 5 shows two column signals Vl and Vl+1 and five row addressing signals Vk . . . Vk+4 as a function of time t for two consecutive frames r and r+1. The duration of a frame or frame period is Tf. In examples, a frame period Tf is a pre-determined period for addressing the n rows of the matrix. In some examples the frame period is the period between consecutive addressing the same row. The duration of the period may be fixed, for example programmed, in the controller 72.

When row k is selected and addressed by a pulse on the row addressing signal Vk, as shown at the start of frame r in FIG. 5, the transistor in each display element of row k becomes conducting and the voltages on each of the column signal lines 92 will be put on the electrode 32 of each display element in row k. Subsequently, the display column driver 94 of FIG. 4 changes the voltages on the column signal lines to the values required for row k+1. When row k+1 is selected by a pulse on row addressing signal k+1, the voltages are put on the electrode 32 of FIG. 1A of the display elements of row k+1. All n rows of the display device will be selected consecutively in a similar manner in frame r. The process of selecting the rows starts again in the following frame r+1.

In examples of common display apparatuses the pulse duration of the voltage pulse of the row addressing signal, also called the gate period Tg or gate time, is such that the n rows of the display device can be addressed consecutively within one frame period. Common display apparatuses have therefore usually a pulse duration equal to or less than Tf/n, n being the number of rows. For example, addressing 1000 rows in a frame period of 20 milliseconds requires a pulse duration of 20 microseconds or less.

The active matrix example just described is used for controlling application of the first voltage between the first electrode and the second electrode. In examples an active matrix type technique is also used for controlling application of the second voltage between the third electrode and the second electrode. Therefore, the electrowetting display device includes a second active matrix. This is illustrated in FIG. 4. Many features of the second active matrix are similar to those of the active matrix described for controlling application of the first voltage. Such features are labelled with the same reference numeral used previously with an added '; corresponding descriptions should be taken to apply. For example, the display column driver which corresponds with the display row driver 74 of the first active matrix described previously is labelled 74'. Thus, a separate display column driver is used for driving the columns of the second active matrix, which receives data input via line 98. However, the same display row driver 76 may be used as illustrated in FIG. 4 with lines 96 connecting the row signal lines 88 of the first active matrix to the row signal lines 88' of the second active matrix. In this way the first voltage and the second voltage may be applied to a display element together, for example they are synchronised with each other due to, for a given display element, the TFT of each of the first and second active matrices responding to apply the appropriate column signal when the relevant row driver stage 86 outputs a row signal.

The example described using FIG. 4 is an example of circuitry for controlling the first and second fluid configuration of each display element. The circuitry includes for example a matrix of TFTs and connectors for connecting the display elements to the controller. It is an example of the first support plate comprising first circuitry 71 including switching elements (such as a TFT) which are independently switchable for controlling application of the first voltage for at least one respective display element of the plurality of display elements; and the second support plate comprising second circuitry 71' including switching elements (such as a TFT) which are independently switchable for controlling application of the second voltage for at least one respective display element of the plurality of display elements. The display element may be any example display element described herein, for example.

In the example of FIG. 4, the first circuitry is for example at least partly mounted on the substrate 8 and the second circuitry is for example at least partly mounted on the substrate 10. In other examples, part of the second circuitry may be mounted on the substrate 8 of the first support plate or vice versa. Therefore, the matrix of TFTs of each active matrix may be formed as part of one of the support plates. Therefore one of the first or second support plates includes both the first circuitry and the second circuitry, with one of the first circuitry or the second circuitry being electrically connected respectively to the first electrode of each of the plurality of display elements or the third electrode of each of the plurality of display elements. This electrical connection may be via a connection line through for example a wall of each display element. This configuration of the circuitry is useful such that fabrication of the circuitry is done as part of one support plate and is therefore simpler than fabricating the circuitry on both support plates. Further, a quality of display effect may be improved if the display effect is not emitted from the display elements through a layer of circuitry; in other words, in examples, the viewing side is not part of a support plate having active matrix circuitry.

Figure 6:
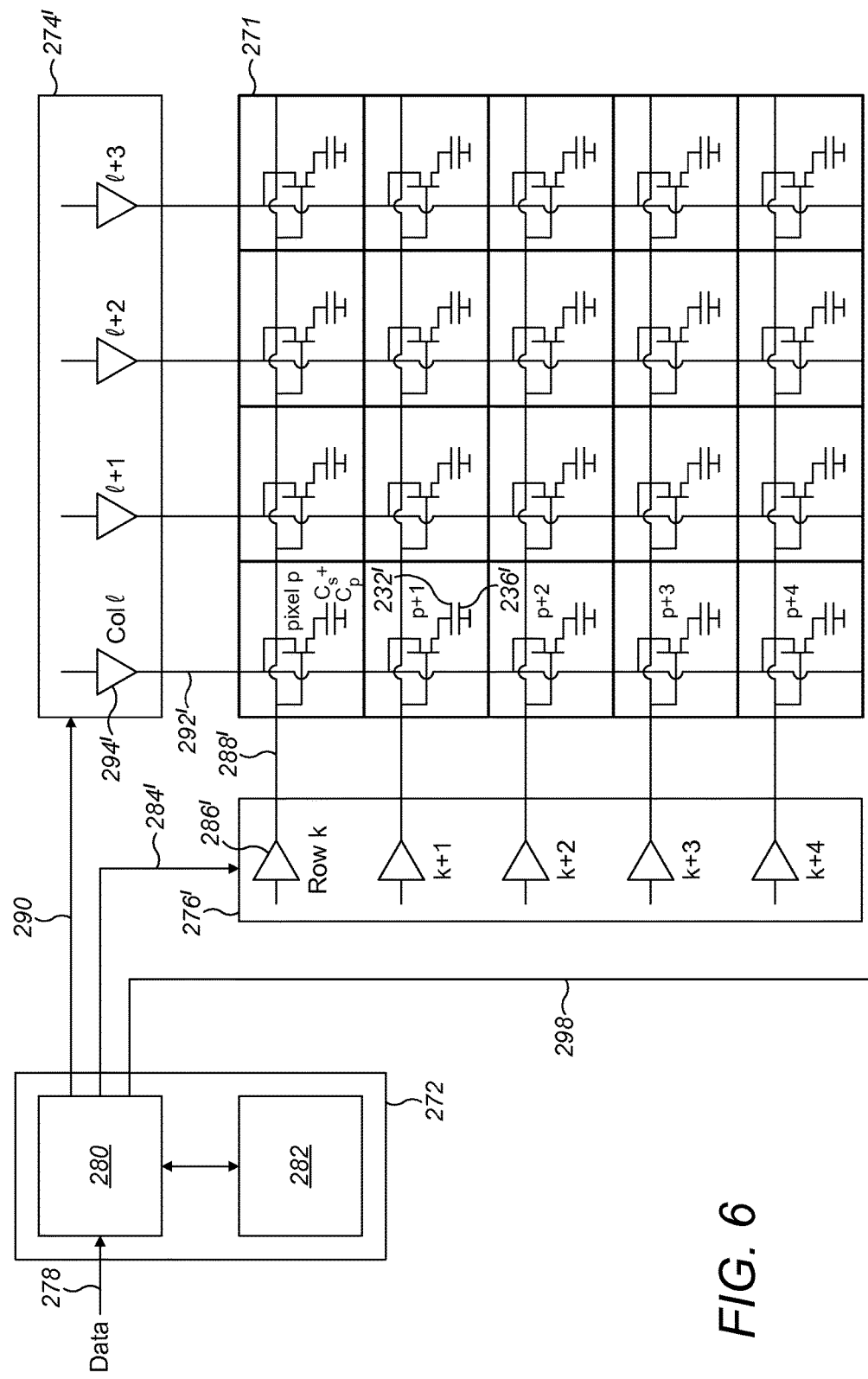
FIG. 6 shows schematically an alternative example of circuitry for controlling the example electrowetting element.
Figure 6:
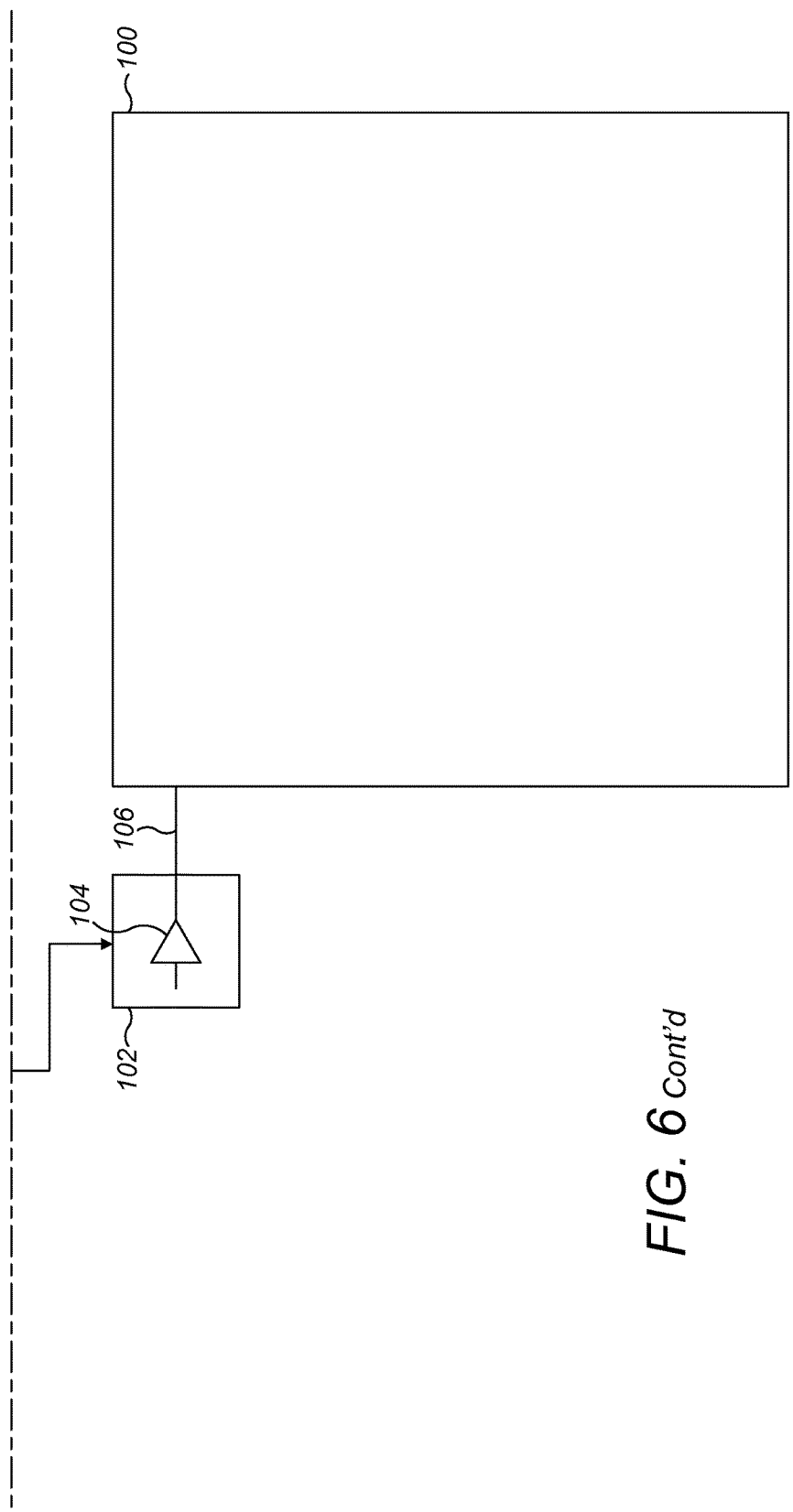

FIG. 6 shows schematically a different example of circuitry for controlling the application of the first and second voltages, compared with the example of FIG. 4. Features described using FIG. 4 are similar to features used in the example of FIG. 6 and are therefore labelled with the same reference numerals incremented by 200. Corresponding descriptions should be taken to apply and are not repeated here, for conciseness. The description which now follows will therefore describe differences from the example of FIG. 4.

In this example, instead of each display element including an individual first electrode, the first electrode of each display element of the plurality of display elements is part of a single electrode 100 which overlaps the surface of the first support plate of each display element. A separate driver 102 for the first electrode is connected to the line 298 for receiving input data for a driver stage 104 to apply the first voltage between the second and first electrodes using the line 106 connecting the driver stage 104 to the first electrode, which line 106 is similar to the line 34 shown in FIG. 1A. The display controller 272 is configured for example to control the separate driver for the first electrode in coordination with application of the second voltage using the active matrix illustrated.

In an example of examples with a single first electrode overlapping the plurality of display elements, the at least one memory and computer program instructions are configured to, with the at least one processor, control the electrowetting display device to apply a voltage between the first electrode and the second electrode of each of the plurality of display elements for transferring substantially all of the first fluid from the surface of the first support plate to the surface of the protrusion, for each respective display element of the plurality of display elements. Substantially all means for example that the display element is driven to the first configuration illustrated in FIG. 2A, this being the fluid configuration which the controller is configured to drive the fluids to the brightest display effect. This transfer can be considered as a reset of all display elements to prepare the display elements for then being individually switched to the respective fluid configuration for each display element. Then, for example subsequently, after the transferring of substantially all of the first fluid, a second voltage with the respective magnitude required for each display element is applied, for switching the first and second fluids of each respective display element to a configuration for providing a required display effect.

It is noted that FIG. 6 shows the single first electrode as part of the first support plate in the lower page of FIG. 6 and that active matrix circuitry of the second support plate is shown in the upper page of FIG. 6. In further examples, instead of a single first electrode, there is an individual first electrode for each display element; instead, the third electrodes are formed as part of a single electrode of the second support plate with a separate driver, similar to that labelled 102 used for applying the second voltage. In further examples, instead of a single electrode performing the function of the first or third electrodes, the first electrodes or third electrodes of one or many rows of display elements may be formed as a single electrode. Therefore, for example, the first support plate may have a plurality of longitudinal electrodes, for example strip shaped, which extend across multiple display elements and which each represent a single row electrode corresponding to a row of first electrodes, for driving a row of display elements together. Each longitudinal electrode would be driven by a separate driver such as that labelled 102. In other examples, the second support plate may instead have a plurality of longitudinal electrodes each representing a single row electrode corresponding to a row of third electrodes.

Further examples of the electrowetting display device are envisaged.

For example, in examples with the protrusion being formed as part of the second support plate, the protrusion may extend from the second support plate but may not contact the first support plate. This is in contrast to the example of FIG. 1A where the protrusion contacts the first support plate. Such an example will now be described with reference to FIGS. 7 and 8. Features of this example are similar to those described using FIGS. 1A to 3B and are labelled with the same reference numerals incremented by 300. Corresponding descriptions should be taken to apply here also and they are not repeated here, for conciseness.

Figure 7:
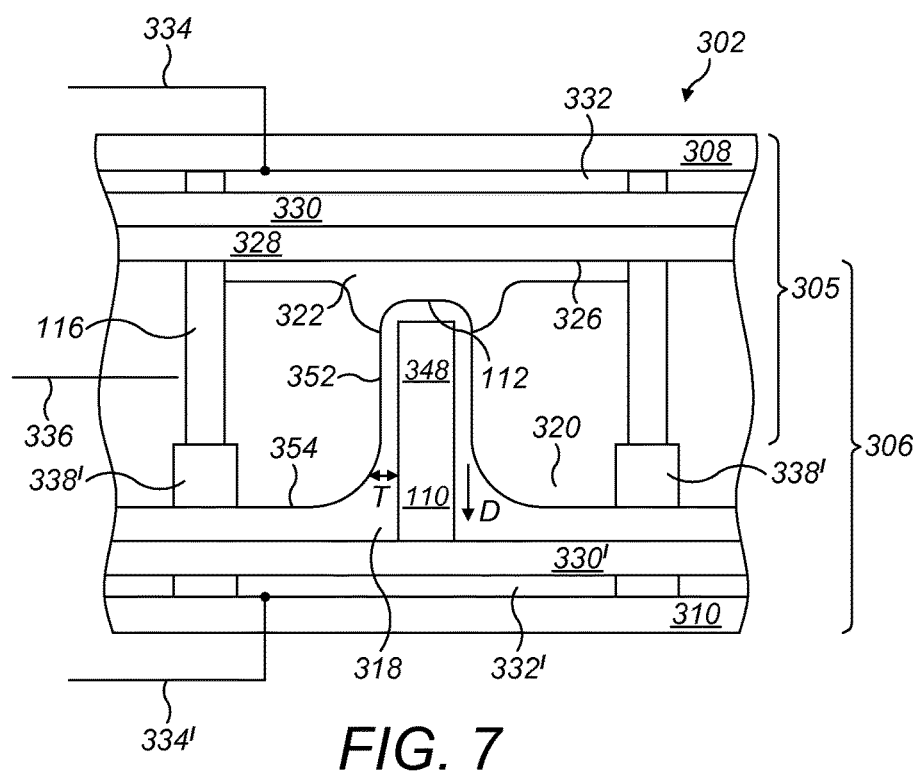
FIGS. 7 and 8 show schematically in cross-section another example of an electrowetting element.

Referring to FIG. 7, the protrusion 110 is formed as part of the second support plate, for example on a layer of the second support plate as in FIG. 1A, but with a part 112 of the protrusion closest to the first support plate being separated from the first support plate by at least one of the first or second fluids. In other words, there is a gap between the protrusion and the surface 326 of the first support plate, which gap is occupied by at least one of the first or second fluids. The part of the protrusion is therefore not contacting the first support plate. In such examples, the protrusion is less or not visible by a viewer of a display effect provided by the display element. Therefore, a quality of a display effect is improved. Plus, as a greater area of the surface of the first support plate is available for light to pass through, a brighter display effect can be provided. FIG. 7 illustrates a second configuration of the first and second fluids which corresponds with the second configuration shown in FIG. 3A in that the second configuration in this example is a darkest display effect displayable by the display element. In this fluid configuration the first fluid adjoins all of the surface 326 of the first support plate.

In examples, such as that of FIG. 7, the first support plate includes at least one wall which extends to contact the at least one wall 338' of the second support plate. In this way the at least one wall of the first support plate 305 may function as a spacer 116 between the first and second support plates, to reduce deformation of the first and second support plates.

In examples, for example that of FIG. 7, a thickness T of the hydrophobic layer 318 covering the structure 348 of the protrusion 110 has a thickness which increases along the protrusion in a direction D away from the first support plate. Where the hydrophobic layer exhibits insulating properties, an increased thickness of the hydrophobic layer exhibits and increased insulating property. Therefore, the insulating property of the protrusion increases in the direction D, which can influence how the first fluid moves and where such movement initiates when the second voltage is applied to move first fluid from the protrusion to the surface of the first support plate. For example, it may be desirable to initiate movement of the first fluid on the protrusion at a part furthest from the first support plate, so that the first fluid tends to move along the protrusion towards the first support plate.

Figure 8:
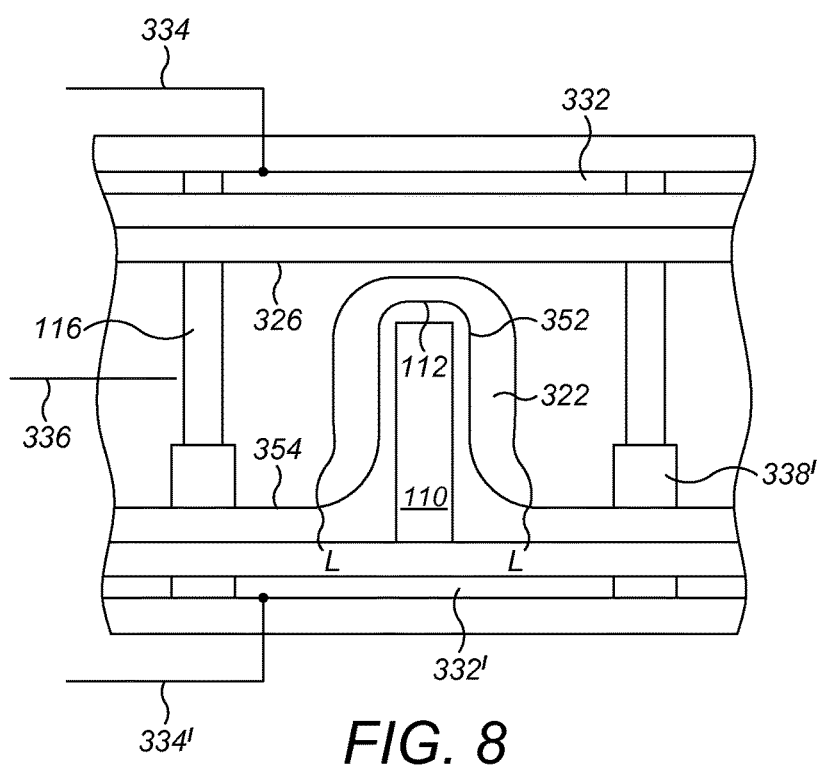

FIG. 8 shows the example of FIG. 7 but with the first fluid in the first configuration, which corresponds to the first configuration of FIG. 2A in that it is the brightest display effect of this display element. In this example, the first fluid does not substantially adjoin any of the surface 326 of the first support plate; instead substantially all of the first fluid adjoins the surface 352 of the protrusion. The term substantially is used here to account for the fact that some negligible deposits of the first fluid may remain on the surface 326 of the first support plate with the first and second fluids being in the first configuration. In the first configuration therefore in this example the part 112 of the protrusion closest to the first support plate is separated from the first support plate by at least the second fluid. With the second fluid being substantially reflective and depending on the thickness of the layer of second fluid between the protrusion and the surface of the first support plate, the first fluid adjoining the surface of the protrusion and/or the surface of the second support plate may not have an influence on the display effect provided by the display element. Further, the second fluid may protect underlying first fluid from exposure to radiation such as ultraviolet radiation which can bleach a dye compound in the first fluid. Therefore the second fluid can help reduce exposure of the first fluid to the radiation and therefore prolong the lifetime of the first fluid.

In a similar manner as described previously, there may be a line L between the surface of the protrusion 352 and a further surface, both surfaces being comprised by the surface of the second support plate. The line delimits an extent of adjoinment of the surface of the second support plate which is wettable by the first fluid. For example, the surface of the protrusion is hydrophobic and the further surface is hydrophilic. In such examples, for example that of FIGS. 7 and 8, the third electrode is comprised by the second support plate and the line is located between the second fluid and the third electrode. This, as described previously, means that, with appropriate design of the display element to locate the line appropriately, a force for moving the first fluid is applied at the interface of the first and second fluids with the surface of the second support plate.

Referring to the example of FIG. 7 for example, with the first and second fluids being configured in the second configuration, for example with substantially all of the first fluid adjoining the surface of the support plate, part of the first fluid adjoins the surface of the protrusion. In this way, smooth movement of the first fluid from the surface of the first support plate to the surface of the protrusion is obtainable, when switching from the second configuration to the first configuration, for example, as the first fluid already contacts the surface of the protrusion and does not need first to span a gap to the surface of the protrusion. Appropriate selection of the volume of the first fluid, the size of the gap between the protrusion and the surface of the first support plate and other parameters of the display element enable this functionality. In other examples, in the second configuration, none of the first fluid may adjoin the surface of the protrusion; however, upon applying the appropriate first and second voltages, capillary effects for example may cause the first fluid to adjoin the surface of the protrusion and transfer thereto. Thus, in examples such as that of FIGS. 7 and 8, a distance between the part 112 of the protrusion and the surface of the first support plate 326 is such that first fluid is transferable from adjoining the surface of the protrusion to adjoining the surface of the first support plate during switching between the first configuration and the second configuration. The exact distance between the part of the protrusion and the surface of the first support plate in examples will depend on other construction parameters of the display element, so that transfer of the first fluid over the distance is possible. For example, the distance is set in examples in dependence on at least one of the following: a wettability for the first fluid of the protrusion surface; a wettability for the first fluid of the surface of the first support plate; a volume of the first fluid; a magnitude of an applied voltage appliable using at least one of the first, second or third electrodes; a viscosity of the first fluid; a surface tension of the first fluid; a viscosity of the second fluid; or a surface tension of the second fluid. The skilled person will readily understand how such parameters influence the transferability of the first fluid over the distance and therefore how the distance may be set accordingly.

In alternative examples from examples described above, the protrusion is formed as part of the first support plate. An example will now be described using FIGS. 9 and 10. Features of this example are similar to features described previously in other examples. Such features are labelled with the same reference numerals incremented by 400. Corresponding descriptions should be taken to apply here and are not repeated, for conciseness.

In examples, with the first support plate including the protrusion, the protrusion 120 has a part 122 closest to the second support plate and which is separated from the second support plate by at least one of the first or second fluids, for example at least the second fluid. The protrusion is separated from the second support plate by a distance such that the first fluid cannot transfer to the second support plate; in examples the display element is designed, for example by modifying reducing a wettability for the first fluid of a part of the protrusion closest to the second support plate, to minimise the size of the separation whilst still preventing first fluid crossing the separation. Therefore the second support plate can be of a simple construction, for example a single substrate 410. The second support plate may also include at least one wall which may be formed as a spacer 124 extending to contact the first support plate, to reduce deformation of the first and second support plates. The bracket labelled 126 to indicate the second support plate indicates the inclusion of the spacers as part of the second support plate. In such examples the second support plate does not include any circuitry and therefore is simple to manufacture.

Figure 9:
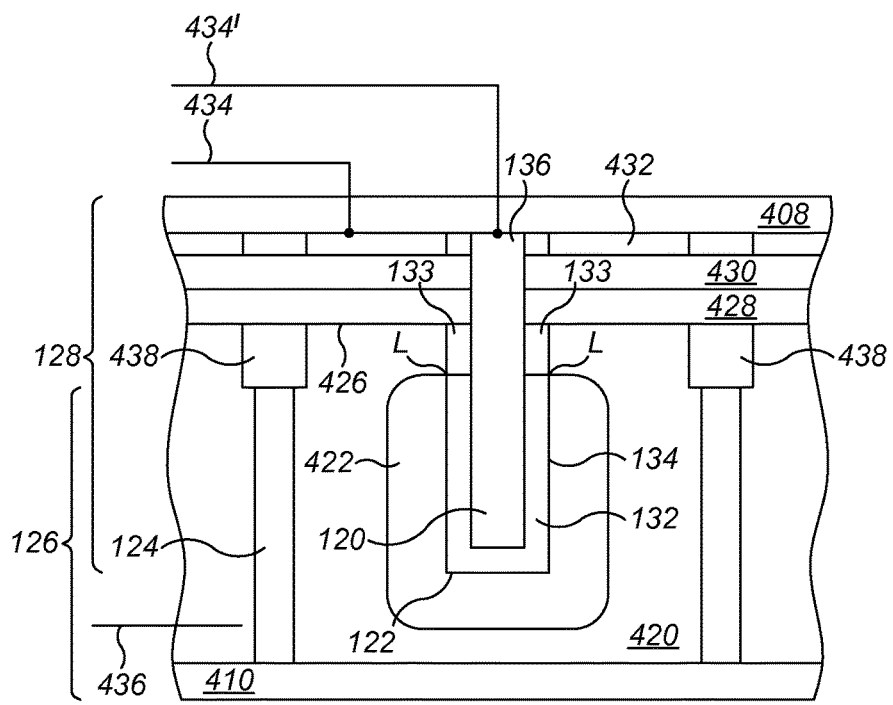
FIGS. 9 and 10 show schematically in cross-section a further example of an electrowetting element.
Figure 10:
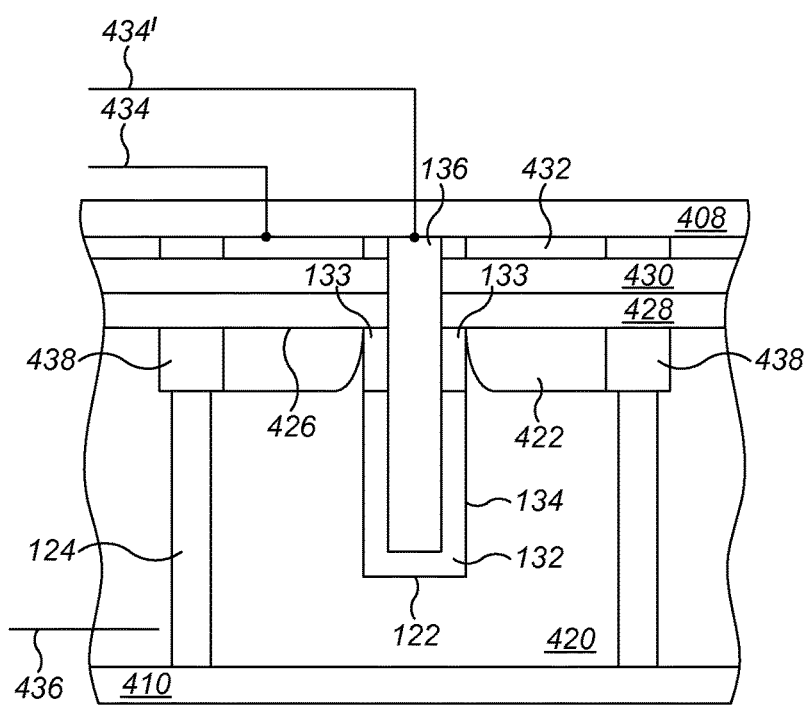

In the example of FIGS. 9 and 10, the first support plate 128 includes a substrate 408, a barrier layer 430 and a hydrophobic layer 428 which provides a surface 426 of the first support plate for adjoinment by at least one of the first or second fluids. The first support plate includes in this example at least one wall 438 similar to those described previously.

In examples with the first support plate comprising the protrusion, the protrusion is formed for example with a structure formed on a layer of the first support plate, for example the barrier layer. A hydrophobic layer 132 for example covers the structure. Therefore, the surface of the first support plate has a wettability for the first fluid and a surface 134 of the protrusion has a wettability for the first fluid, in both cases where no voltage is applied. As explained previously in other examples, the surface of the first support plate 426 for example has a greater wettability for the first fluid than the surface of the protrusion, with both of those surfaces being formed of a hydrophobic material for example.

In examples, such as that of FIGS. 9 and 10, the surface of the protrusion comprises a first part. A second part, which provides a further surface of the protrusion, is located between the first part and the surface of the first support plate. Without a voltage applied, the first part has a greater wettability for the first fluid than the second part. The surface of the protrusion in examples lies out of the plane of the surface 426 of the first support plate. The first part is for example the hydrophobic layer 132. The second part 133 is for example formed of a hydrophilic material. Thus, where the first part and the second part adjoin each other, a line L is formed representing a change of wettability for the first fluid and which, with the fluids in the first configuration shown in FIG. 9, is a limit of the extent of wetting of the first fluid of the surface of the protrusion. In some examples, the second part and therefore the further surface of the protrusion has an extent which corresponds to a thickness of the first fluid with substantially all of the first fluid adjoining the surface of the first support plate, the extent and the thickness being taken in a direction perpendicular to a plane of the surface of the first support plate; this is illustrated using FIG. 9 which shows a first configuration of the first and second fluids corresponding with a brightest display effect of the display element, as no (or a negligible amount) of the first fluid adjoins the surface 426 of the first support plate.

In examples such as that of FIGS. 9 and 10 the first electrode 432 is similar to that described in earlier examples except that it is shaped to surround the third electrode which is part of the first support plate too. Therefore, in this example, where the protrusion has a circular cross section, the first electrode has a circular cut-out, for example a hole or aperture, at its centre to accommodate the third electrode. There is a layer of non-conductive material (not labelled) between the first and third electrodes which electrically insulates the first and third electrodes from each other. Therefore, in examples such as that of FIGS. 9 and 10, the first support plate comprises the protrusion and the third electrode. The third electrode in some examples such as that of FIGS. 9 and 10 is a third electrode 136 which forms part of the protrusion 120. For example, as shown in the present example, the third electrode extends substantially along a length of the protrusion; for example, the third electrode extends along the length of the protrusion until the hydrophobic layer 132. The protrusion 120 of the example of FIGS. 9 and 10 is located substantially centrally as described previously for FIG. 1A for example.

The third electrode is for example formed of a suitable material, for example indium tin oxide (ITO) which may be used to form the first and/or third electrode in this and other examples. The third electrode is for example connected to the controller by the signal line 434'. According to various examples described herein, therefore, the third electrode may form part of at least one of the protrusion, the first support plate or the second support plate. This offers flexibility in the design of the display element.

In examples with the protrusion comprising the third electrode, for example that of FIGS. 9 and 10, the first fluid may be transferred from adjoining the surface of the protrusion to adjoin the surface of the first support plate using appropriate application of the first voltage between the first and second electrodes and the second voltage applied between the third and second electrodes, similar to techniques described previously with relation to application of the first and second voltages. For example, a suitable magnitude and duration of applying the voltages may be used. For the example of FIGS. 9 and 10, with the first and second fluids being in the first configuration as shown in FIG. 9, the first fluid may be transferred to adjoin the surface of the first support plate by applying for example a first voltage with a lower magnitude than the magnitude of the applied second voltage. Once the voltages are removed, for example are no longer applied, the first fluid, now in the second configuration as illustrated in FIG. 10, remains in the second configuration. This is because, for example, of the presence of the second part 133 which resists wetting by the first fluid and therefore acts as a barrier for first fluid to move to the first part of the surface of the protrusion until appropriate magnitudes of the first and second voltages are applied which are sufficient to move first fluid over the second part (which may be considered as the first fluid jumping over the second part) and onto the first part of the surface of the protrusion. Thus, with the second part functioning as a barrier, the protrusion can act as a reservoir of first fluid, with the amount of first fluid adjoining the surface of the first support plate and the amount of first fluid adjoining the surface of the protrusion being controllable by selectively moving amounts of first fluid over the second part, either onto or from the surface of the protrusion.

Figure 11:
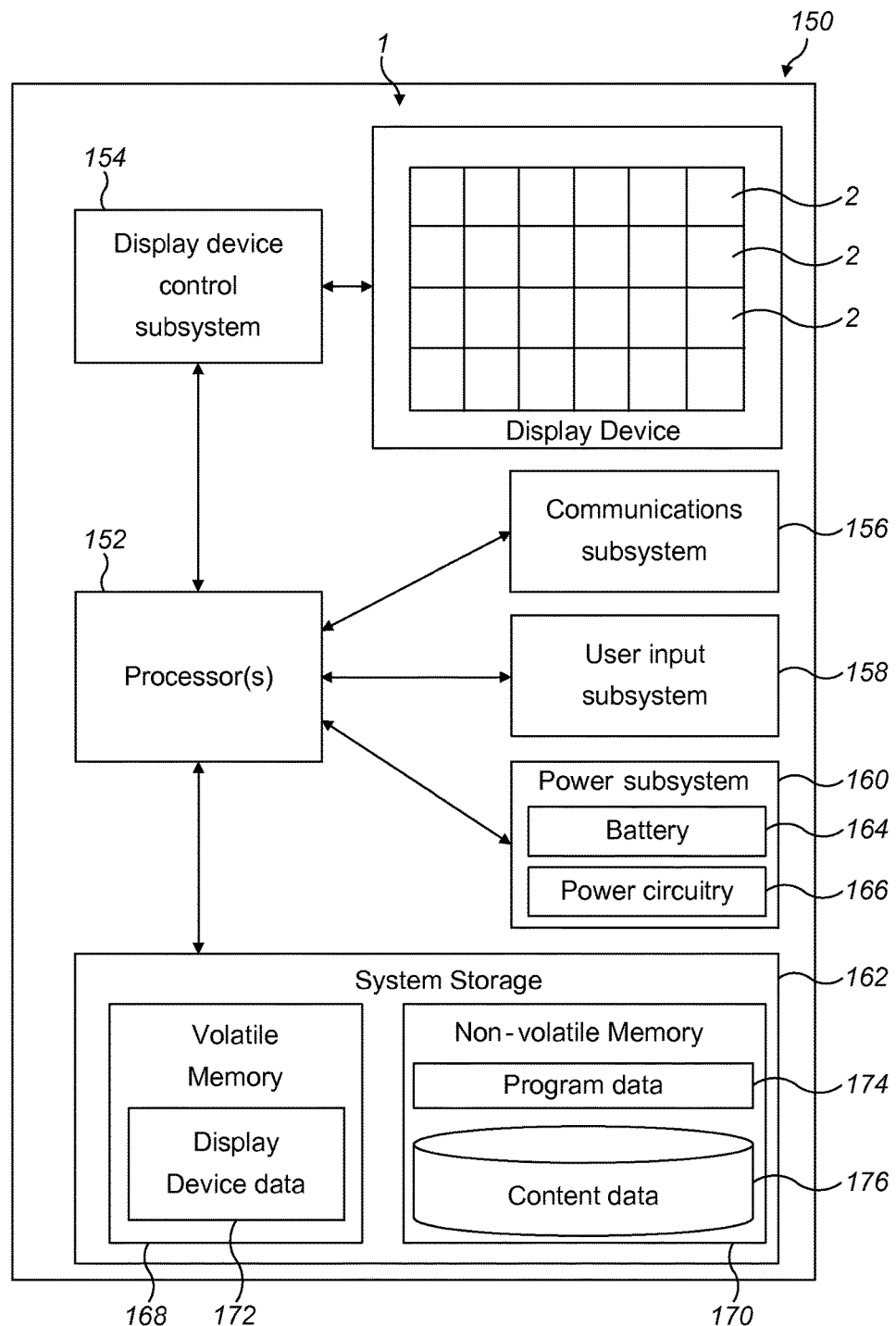
FIG. 11 shows schematically a system diagram of an example apparatus including an electrowetting display device.

FIG. 11 shows schematically a system diagram of an example system, for example apparatus 150, comprising an electrowetting display device such as any of the examples described above, for example the electrowetting display device described above comprising electrowetting display elements 2. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 150. The apparatus includes at least one processor 152 connected to and therefore in data communication with for example: a display device control subsystem 154, a communications subsystem 156, a user input subsystem 158, a power subsystem 160 and system storage 162. The display device control subsystem is connected to and is therefore in data communication with the display device. The at least one processor 152 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 162. The at least one processor may additionally, or in the alternative, contain memory, such as processor registers.

The display device control subsystem 154 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 156 for example is configured for the apparatus to communicate with for example a computing device via a data network, for example a computer network such as the Internet, a local area network, a wide area network, a telecommunications network, a wired network, a wireless network, or some other type of network. The communications subsystem 156 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 158 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 160 for example includes power circuitry 166 for use in transferring and controlling power consumed by the apparatus. The power may be provided by a mains electricity supply or from a battery 164, via the power circuitry. The power circuitry may further be used for charging the battery from a mains electricity supply.

The system storage 162 includes at least one memory, for example at least one of volatile memory 168 and non-volatile memory 170 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 11, the volatile memory 168 stores for example display device data 172 which is indicative of display effects to be provided by the display device. The processor 152 may transmit data, based on the display device data, to the display device control subsystem 154 which in turn outputs signals to the display device for applying voltages to the display elements, for providing display effects from the display device. The non-volatile memory 170 stores for example program data 174 and/or content data 176. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The skilled person will readily understand examples of techniques which can be used to manufacture an electrowetting display device according to examples described herein. Examples will now be given, but it is to be appreciated that numerous further examples are envisaged.

Examples of a manufacture method are given and refer also to FIG. 13 An example method of manufacturing an electrowetting display device will now be described. The example described focuses on the features of one display element (e.g. that of FIG. 1A) but it is to be appreciated that the manufacturing method example applies for a device comprising a plurality of display elements.

A support plate, for example the second support plate, is formed which comprises the protrusion. A substrate is provided and then at least one layer is deposited on the substrate using for example chemical or physical vapour deposition (CVD or PVD) for example sputter deposition or electron beam evaporation where temperature, pressure and power are controlled appropriately, as would be understood by the skilled person.

The at least one layer includes for example at least one electrode and a barrier layer as described previously using FIG. 1A for example. Further layers may also be deposited and patterned to form circuitry for controlling the display elements. A layer, for example an electrode precursor layer, of the at least one layer is patterned to form the electrode of for example ITO using an appropriate patterning technique as the skilled person would understand. An example of such a patterning technique involves masking areas of the electrode precursor layer to remain after the patterning with a photoresist material, using a photo lithography technique to harden the photoresist in areas where the at least one electrode is to be formed, removing the un-hardened photoresist and then etching the deposited metal not covered by the photoresist, for example an acidic etching solution.

A further layer, for example a protrusion precursor layer, is deposited on the at least one layer, for example on the barrier layer, and is patterned to form at least part of a protrusion on the at least one layer, the protrusion having an elongate shape extending from the at least one layer. The protrusion may for example be formed of SU8 photoresist and may be patterned using a photolithography process as the skilled person would readily understand. An example of such a photolithography process involves for example after spreading the SU8 photoresist material on the at least one layer, patterning using ultraviolet light applied selectively, using a mask, to the photoresist material. Hard baking is then performed of the photoresist material which is then developed using an appropriate development solution the skilled person would readily be familiar with. In some examples, the protrusion may now be formed, but in other examples further stages are required. For example, the patterning of the further layer is a patterning to form an elongate structure of the protrusion. Then, a coating is applied on part of the at least one layer (for example a part of the barrier layer on which the elongate structure is not formed) and on the elongate structure of the protrusion. This coating has an outer surface which is for adjoinment with at least one of the first or second fluids of the electrowetting display device. The coating may for example be a hydrophobic material, for example Teflon®AF1600, which is for example applied using a slit coating or spin coating technique which is well known in the art. In some examples the coating may be applied with a thickness which decreases along a length of the protrusion. The term applied is used here for the application of the coating compared with the term depositing used in relation to depositing the at least one layer, to distinguish in examples between different types of application and deposition techniques. For example depositing the at least one layer may use a vapour deposition type of technique in contrast to using a wet process for applying the coating (for example spin coating).

In some examples the outer surface of the coating may be treated, for example to change a property of the outer surface of the coating, for example to reduce the wettability for the first fluid. This treatment may be reactive ion etching (RIE), for example using radio frequency initiated plasma, which the skilled person would readily be familiar with and which can be applied selectively to form parts of a surface of the second support plate which are to have a lower wettability for the first fluid than other parts (though in other examples different materials may additionally or instead be applied which have different wettability properties, for forming surfaces with different wettability properties). After the coating has been applied, wall material is deposited on the at least one layer. The wall material may be applied directly to a surface of the at least one layer or may be on (e.g. supported by but not directly in contact with) the at least one layer. The wall material may for example be applied to an area of the outer surface of the coating which may have been treated to improve adhesion between the surface and the wall material. The wall material may then be patterned to form at least one wall for confining the first fluid to a display area of the second support plate. The wall material may be SU8 and the patterning may therefore be performed using an appropriate photoresist technique as the skilled person will readily understand.

In some examples the protrusion comprises an electrode such as the third electrode described above. Therefore, in such examples, the depositing a further layer (for example the protrusion precursor layer) stage of the method includes depositing a further layer of material for being patterned to form part of the protrusion as an electrode.

With one support plate such as the second support plate now being manufactured, a further support plate, for example the first support plate is formed. This involves for example depositing at least one layer on a further substrate and patterning a layer of the at least one layer on the further substrate to form a further electrode. Thus, a similar support plate to that just described as being manufactured may be formed with the wall structures but without the protrusion. Then the first fluid is dispensed on a surface of the first support plate (though in other examples where the first support plate comprises the protrusion the first fluid may instead be dispensed on a surface of the second support plate) using for example a dosing technique known to the skilled person. The second fluid is also dispensed, for example in a container in which the first and second support plates are immersed when being joined together. Then the first and second support plates (in this example the further support plate and the support plate having the protrusion) are adjoined with the first and second fluids being located between the support plates. This adjoining may be done using for example an adhesive seal provided at an outermost perimeter of an array of the display elements. This manufacture technique is simple as known techniques can be used. Plus, although in the final manufactured device the first fluid may adjoin both the surface of the protrusion and the surface of the support plate, during manufacture the first fluid can simply be dispensed on the surface of one of the support plates such as the first support plate, for then being transferred to adjoin the protrusion surface after manufacture.

The above examples are to be understood as illustrative examples. Further examples are envisaged.

For example, in some examples, the protrusion may be formed as part of a wall for substantially confining the first fluid to adjoin a display area of the surface of the first support plate, rather than the protrusion being laterally separated from the wall by the first and/or second fluid. In such examples the wall may extend from the first support plate to the second support plate and the protrusion formed as part of the wall may also extend from one support plate to the other, to act as a conduit or a path for the first fluid to flow to the surface of the first support plate. The protrusion as part of a wall does not extend across a whole surface of a wall adjoined by one of the first or second fluids. Instead, the protrusion forms a narrow, for example elongate, area on the wall surface of a different wettability for the first fluid than the rest of the wall surface. The wall may therefore be predominantly hydrophilic but the protrusion has for example a more wettable surface for the first fluid in the absence of an applied voltage. In such examples the second fluid may not be reflective but may instead be substantially transmissive for visible light by for example transmitting 50% or more of visible light incident on the second fluid.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:
1. An apparatus comprising:
   an electrowetting display device comprising:
      a first support plate comprising:
         a first surface;
         a first electrode; and
         at least one wall;
      a second support plate;
      at least one of the first support plate or the second support plate comprising a protrusion having a second surface, the protrusion having an elongate shape extending from a respective one of the first support plate or the second support plate towards a respective other of the first support plate or the second support plate,
      a first fluid in adjoinment with at least one of the second surface or the first surface;
      a second fluid immiscible with the first fluid, the first fluid and the second fluid located between the first support plate and the second support plate;
      a second electrode in electrical contact with the second fluid; and
      a third electrode, the first support plate or the second support plate comprising the third electrode,
      wherein a configuration of the first fluid and the second fluid is switchable, using a voltage applied between at least two of the first electrode, the second electrode or the third electrode,
   processor circuitry; and
   memory circuitry operable to, with the processor circuitry, control a volume of the first fluid in adjoinment with the second surface and a volume of the first fluid in adjoinment with the first surface by:
      control of a first magnitude of a first voltage applied between the first electrode and the second electrode; and
      control of a second magnitude of a second voltage applied between the third electrode and the second electrode.

2. The apparatus according to claim 1, wherein the memory circuitry is operable to, with the processor circuitry:
   set the first magnitude less than the second magnitude and then
   set the first magnitude greater than the second magnitude.

3. The apparatus according to claim 1, wherein the memory circuitry is operable to, with the processor circuitry:
   set the first magnitude to a zero magnitude and the second magnitude to a non-zero magnitude; and then
   set the first magnitude to a non-zero magnitude and the second magnitude to a zero magnitude.

4. The apparatus according to claim 1, wherein the memory circuitry is operable to, with the processor circuitry, at least one of:
set at least one of the first magnitude or the second magnitude; or
set a duration of application of at least one of the first voltage or the second voltage.

5. The apparatus according to claim 1, wherein the second support plate comprises the protrusion and the third electrode.

6. The apparatus according to claim 1, wherein the first support plate comprises the protrusion and the third electrode.

7. The apparatus according to claim 6, wherein the protrusion comprises the third electrode and the protrusion is separated from the second support plate by at least the second fluid.

8. The apparatus according to claim 7, wherein the third electrode extends substantially along a length of the protrusion.

9. The apparatus according to claim 1, wherein the second support plate comprises the third electrode and the third electrode overlaps the protrusion.

10. The apparatus according to claim 1, wherein the memory circuitry is operable to, with the processor circuitry:
apply the first voltage and the second voltage; then
withhold application of a further first voltage between the first electrode and the second electrode; and
withhold application of a further second voltage between the third electrode and the second electrode; and then
apply at least one of the further first voltage or the further second voltage.

11. The apparatus according to claim 1, comprising a first display element and a second display element each respectively comprising:
the first surface;
the protrusion;
the first fluid;
the second fluid;
the first electrode; and
the third electrode.

12. The apparatus according to claim 11, wherein:
the first support plate comprises first circuitry comprising switching elements independently switchable for control of application of the first voltage for at least one of the first display element or the second display element; and
the second support plate comprises:
the third electrode of each of the first display element and the second display element;
second circuitry comprising switching elements independently switchable for control of application of the second voltage for at least one of the first display element or the second display element.

13. The apparatus according to claim 11, the first support plate comprising the third electrode of each of the first display element and the second display element,
wherein the first support plate comprises:
first circuitry comprising switching elements independently switchable for control of application of the first voltage for at least one of the first display element or the second display element; and
second circuitry comprising switching elements independently switchable for control of application of the second voltage for at least one of the first display element or the second display element.

14. The apparatus according to claim 13, wherein, for each of the first display element and the second display element, the protrusion comprises the third electrode.

15. The apparatus according to claim 11, the second support plate comprising the third electrode of each of the first display element and the second display element, wherein one of the first support plate or the second support plate comprises:
first circuitry comprising switching elements switchable for control of application of the first voltage for at least one of the first display element or the second display element; and
second circuitry comprising switching elements switchable for control of application of the second voltage for at least one of the first display element or the second display element,
wherein at least one of:
the first circuitry is electrically connected to the first electrode of each of the first display element and the second display element, or
the second circuitry is electrically connected to the third electrode of each of the first display element and the second display element,
via at least one electrical connection that extends between the first support plate and the second support plate.

16. The apparatus according to claim 1, the electrowetting display device comprising a plurality of display elements each respectively comprising:
the first surface;
the protrusion;
the first fluid;
the second fluid; and
the third electrode,
wherein the first electrode is a single electrode that overlaps the first surface of each of the plurality of display elements.

17. The apparatus according to claim 16, wherein the memory circuitry is operable to, with the processor circuitry, control the electrowetting display device to:
apply a voltage between the first electrode and the second electrode of each of the plurality of display elements for transfer of substantially all of the first fluid from the first surface to the second surface, for each respective display element of the plurality of display elements, and then
apply the second voltage having a respective second magnitude for each respective display element of the plurality of display elements, to switch the first fluid and the second fluid of each respective display element to a configuration to provide a required display effect.

18. The apparatus according to claim 1, wherein the memory circuitry is operable to, with the processor circuitry, switch a configuration of the first fluid and the second fluid between:
a first configuration with:
a first volume of the first fluid in adjoinment with the second surface; and
a second volume of the first fluid in adjoinment with the first surface, and
a second configuration with:
a third volume of the first fluid adjoinment with the second surface, the third volume less than the first volume; and
a fourth volume of the first fluid in adjoinment with the first surface, the fourth volume greater than the second volume, by the control of the first magnitude and the second magnitude.

19. A method of controlling an electrowetting display device, the method comprising:
controlling at least one of:
a first magnitude of a first voltage applied between a first electrode of a first support plate, the first support plate comprising at least one wall, and a second electrode in electrical contact with a second fluid; and
a second magnitude of a second voltage applied between the second electrode and a third electrode of the first support plate or a second support plate, thereby switching a configuration of a first fluid and the second fluid, in dependence on the first magnitude and the second magnitude, and controlling:
a volume of the first fluid in adjoinment with a second surface of a protrusion of at least one of the first support plate or a second support plate, and
a volume of the first fluid in adjoinment with a first surface of the first support plate.

20. The method according to claim 19, wherein the controlling comprises setting the first magnitude lower than the second magnitude.

21. The method according to claim 19, wherein the controlling comprises setting the first magnitude greater than the second magnitude.

22. The method according to claim 19, wherein the controlling comprises setting the first magnitude to a zero magnitude and setting the second magnitude greater than the first magnitude.

23. A method according to claim 19, wherein the controlling comprises setting the second magnitude to a zero voltage and setting the first magnitude greater than the second magnitude.

24. The method according to claim 19, comprising after the switching:
substantially maintaining a configuration of the first fluid and the second fluid by:
applying the first voltage and the second voltage; then withholding applying a further first voltage between the first electrode and the second electrode; and
withholding applying a further second voltage between the third electrode and the second electrode; and then
applying at least one of the further first voltage or the further second voltage to switch the first fluid and the second fluid to a different configuration.

\* \* \* \* \*

UNITED STATES PATENT AND TRADEMARK OFFICE
CERTIFICATE OF CORRECTION

PATENT NO. : 9,759,905 B2
APPLICATION NO. : 14/579680
DATED : September 12, 2017
INVENTOR(S) : Massard It is certified that error appears in the above-identified patent and that said Letters Patent is hereby corrected as shown below:

In the Claims

In Column 26, Line 59, in Claim 2, delete "magnitude and" and insert -- magnitude; and --, therefor.

In Column 27, Line 51, in Claim 12, delete "element;" and insert -- element; and --, therefor.

In Column 28, Line 62, in Claim 18, delete "first fluid adjoinment" and insert -- first fluid in adjoinment --, therefor.

In Column 30, Line 8, in Claim 23, delete "A method" and insert -- The method --, therefor.

Signed and Sealed this
Twenty-seventh Day of March, 2018

Andrei Iancu
*Director of the United States Patent and Trademark Office*